US012699462B2

(12) United States Patent
    Kojima

(10) Patent No.: US 12,699,462 B2
(45) Date of Patent: Aug. 4, 2026

(54) RECORDING MEDIUM, IMAGE PROCESSING DEVICE, IMAGE PROCESSING METHOD, AND IN-VEHICLE INTERFACE DEVICE

(71) Applicant: Deep Insight Inc., Tokyo (JP)

(72) Inventor: Ryuichi Kojima, Tokyo (JP)

(73) Assignee: Deep Insight Inc., Tokyo (JP)

( * ) Notice: Subject to any disclaimer, the term of this patent is extended or adjusted under 35 U.S.C. 154(b) by 0 days.

(21) Appl. No.: 18/858,563

(22) PCT Filed: Apr. 28, 2023

(86) PCT No.: PCT/JP2023/016793
    § 371 (c)(1),
    (2) Date: Oct. 21, 2024

(87) PCT Pub. No.: WO2023/214542
    PCT Pub. Date: Nov. 9, 2023

(65) Prior Publication Data
    US 2026/0037071 A1      Feb. 5, 2026

(30) Foreign Application Priority Data
    May 2, 2022    (JP) ................................ 2022-076295

(51) Int. Cl.
    G06F 3/01          (2006.01)
    B60K 35/10         (2024.01)
        (Continued)

(52) U.S. Cl.
    CPC .............. G06F 3/017 (2013.01); B60K 35/10 (2024.01); G06V 10/764 (2022.01); G06V 40/28 (2022.01);
        (Continued)

(58) Field of Classification Search
    CPC .......... G06F 3/017; G06F 3/0304; G06F 3/01; G06F 3/0346; G06F 3/04812;
        (Continued)

(56) References Cited

U.S. PATENT DOCUMENTS 6,052,115 A * 4/2000 Gregg ................. G06F 3/04892
                                                  345/157
10,802,600 B1 * 10/2020 Ravasz ................... G06F 3/013
        (Continued)

FOREIGN PATENT DOCUMENTS

| JP | 2011-133942 A | 7/2011 |
| JP | 2012-248067 A | 12/2012 |
| JP | 2016-520946 A | 7/2016 |

OTHER PUBLICATIONS

English Translation of International Search Report for PCT Application No. PCT/JP2023/016793 mailed Jul. 18, 2023.

*Primary Examiner* — Grant Sitta
(74) *Attorney, Agent, or Firm* — Christian S. Hans; Bret E. Field; Bozicevic, Field & Francis LLP

(57) ABSTRACT

Provided are a recording medium, an image processing device, an image processing method, and an in-vehicle interface device capable of realizing a non-contact user interface matching a subjective opinion of a user.

A computer readable non-transitory recording medium recording a computer program causes a computer to execute processes of acquiring an image in which a plurality of indicators is captured, and setting a pointer designating a position represented by ends of a first indicator and a second indicator at a position between the end of the first indicator and the end of the second indicator specified based on the acquired image.

35 Claims, 31 Drawing Sheets

(51) Int. Cl.

| | |
|---|---|
| *B60K 35/65* | (2024.01) |
| *G06V 10/764* | (2022.01) |
| *G06V 40/20* | (2022.01) |

(52) U.S. Cl.
CPC ...... *B60K 35/654* (2024.01); *B60K 2360/146* (2024.01); *B60K 2360/741* (2024.01)

(58) Field of Classification Search
CPC ..... G06F 3/0487; B60K 35/10; B60K 35/654; B60K 2360/146; B60K 2360/741; G06V 10/764; G06V 40/28; G06T 7/00
See application file for complete search history.

(56) References Cited

U.S. PATENT DOCUMENTS

| | | | | |
|---|---|---|---|---|
| 10,936,110 | B1 * | 3/2021 | Moseley | G06F 3/04842 |
| 12,619,335 | B2 * | 5/2026 | Holz | G06F 3/04815 |
| 2004/0217267 | A1 * | 11/2004 | Reime | G06F 3/0346 |
| | | | | 250/221 |
| 2012/0293544 | A1 * | 11/2012 | Miyamoto | G06F 3/005 |
| | | | | 345/620 |
| 2012/0306740 | A1 | 12/2012 | Hoda | |
| 2013/0167062 | A1 * | 6/2013 | Herring | G06F 3/04883 |
| | | | | 715/764 |
| 2014/0204002 | A1 * | 7/2014 | Bennet | G06F 3/017 |
| | | | | 345/7 |
| 2015/0035746 | A1 | 2/2015 | Cockburn et al. | |
| 2015/0062006 | A1 | 3/2015 | Karakotsios et al. | |
| 2015/0220149 | A1 | 8/2015 | Plagemann et al. | |
| 2016/0124513 | A1 | 5/2016 | Dal Zot et al. | |
| 2020/0218349 | A1 * | 7/2020 | Chu | G06F 3/011 |
| 2021/0026455 | A1 | 1/2021 | Dash et al. | |
| 2021/0118038 | A1 * | 4/2021 | Schmidt | G06T 11/00 |
| 2021/0263593 | A1 * | 8/2021 | Lacey | G02B 27/017 |
| 2021/0405760 | A1 | 12/2021 | Schoen | |

* cited by examiner

FIG.4

Camera Image Including Right Hand

Image Including Left Hand

FIG.8

| Class | Title | Image Example |
|---|---|---|
| 0 | Pointer : Non-Selected State | |
| 1 | Pointer : Selected State | |
| 2 | Non-Pointer  Part 1 | |
| 3 | Non-Pointer  Part 2 | |
| 4 | Non-Pointer  Part 3 | |
| 5 | Non-Pointer  Part 4 | |
| 6 | Non-Pointer  Part 5 | |
| 7 | Non-Pointer  Part 6 | |
| 8 | Non-Pointer  Part 7 | |
| 9 | Non-Pointer  Part 8 | |
| 1 0 | Non-Pointer  Part 9 | |
| 1 1 | Non-Pointer  Part 10 | |
| 1 2 | Part 11 (Other Than Finger) | |

Compare Curvature of Fingertip End

Cutting Edge of Fingertip

Not Recognized as
Fingertip End

Search Axis

RECORDING MEDIUM, IMAGE PROCESSING DEVICE, IMAGE PROCESSING METHOD, AND IN-VEHICLE INTERFACE DEVICE

CROSS-REFERENCE TO RELATED APPLICATIONS

This application is the national phase under 35 U.S.C. § 371 of PCT International Application No. PCT/JP2023/016793 which has an International filing date of Apr. 28, 2023 and designated the United States of America.

BACKGROUND ART

In recent years, research and development of a non-contact user interface that responds to an action using a human hand or body have become active.

Japanese Patent Laid-Open Publication No. 2011-133942 discloses a device that captures a finger using a camera when a user brings the finger close to a display, estimates an action intention of the user based on a gesture of a hand or finger of the user approaching the display and a position of the finger with respect to the display on the basis of the captured image, and controls an image output means so that a displayed image is changed according to the estimated action intention.

SUMMARY

Even though the device of Japanese Patent Laid-Open Publication No. 2011-133942 provides a non-contact user interface function, the user needs to perform an action of bringing the finger close to the display, and there is a limitation in that the finger needs to be close enough to touch the display.

In addition, when the action intention of the user is estimated based on the gesture of the hand or finger and the position of the finger with respect to the display, movement of the hand or finger or the position of the finger deviates from a subjective opinion of the user in some cases, and there is a possibility that the user may feel uncomfortable.

The disclosure has been made in view of the above circumstances, and the object of the invention is to provide a recording medium, an image processing device, an image processing method, and an in-vehicle interface device capable of realizing a non-contact user interface matching a subjective opinion of a user.

The present application includes a number of means for solving the above problems. To give an example of such means, a computer readable non-transitory recording medium recording a computer program causes a computer to execute processes of acquiring an image in which a plurality of indicators is captured, and setting a pointer designating a position represented by ends of a first indicator and a second indicator at a position between the end of the first indicator and the end of the second indicator specified based on the acquired image.

According to the disclosure, it is possible to realize a non-contact user interface matching a subjective opinion of a user.

The above and further objects and features of the invention will more fully be apparent from the following detailed description with accompanying drawings.

BRIEF DESCRIPTION OF DRAWINGS

FIG. 4 is a diagram illustrating an example of a configuration of an image processor.

FIG. 8 is a diagram illustrating an example of classification of a shape of the hand or finger.

FIG. 21 is a diagram illustrating an example of range adjustment of a moving average.

FIG. 27 is a diagram illustrating an example of a configuration of a tracking detector.

DESCRIPTION

Hereinafter, embodiments of the disclosure will be described with reference to the drawings.

Embodiment 1

Figure 1:
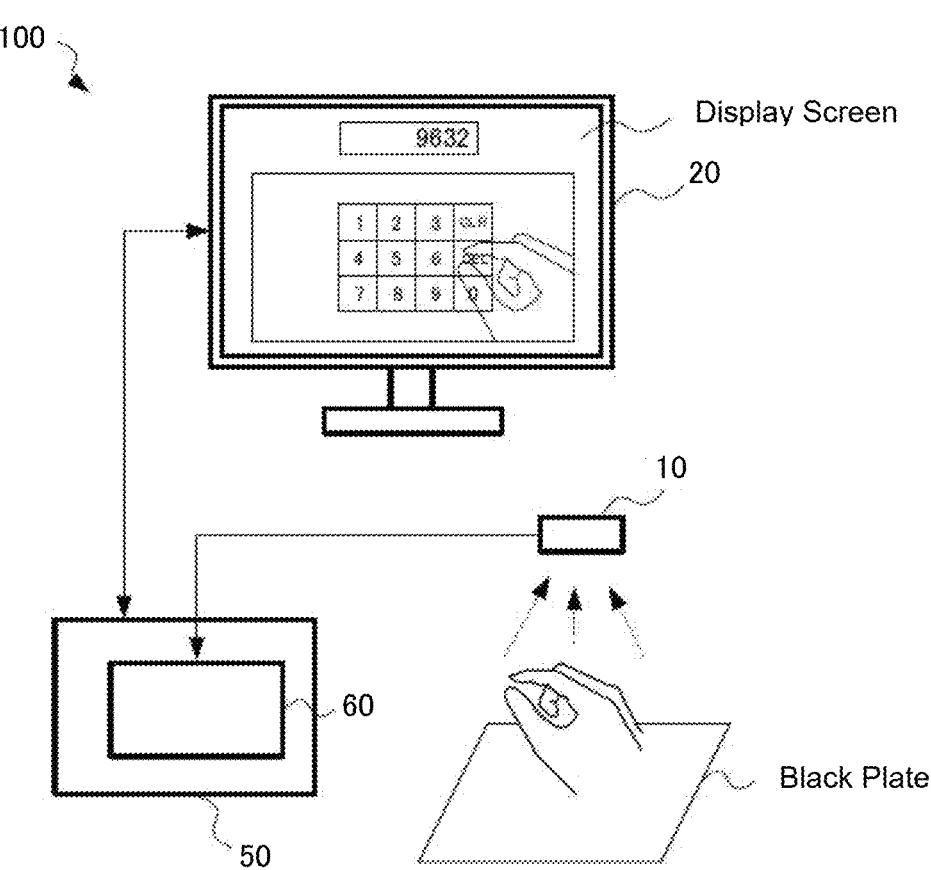
FIG. 1 is a diagram illustrating an example of a configuration of a non-contact user interface system.

FIG. 1 is a diagram illustrating an example of a configuration of a non-contact user interface system 100. The non-contact user interface system 100 includes a camera 10, a display device 20 having a display screen, and an image processing device 50. The image processing device 50 includes an image processor 60 having a function as a non-contact user interface device. The image processing device 50 may be configured as, for example, a personal computer. The image processor 60 is not limited to a configuration in which the image processor 60 is incorporated in the image processing device 50, and may be configured as a device separate from the image processing device 50. The camera 10 is not limited to a general image obtained using visible light or infrared light, and may be a TOF (Time Of Flight) camera that can also measure distance.

The camera 10 is disposed at a position where a black plate can be captured. The position of the camera 10 can be set appropriately as long as the black plate can be captured at the position. At an appropriate position between the camera 10 and the black plate, for example, a user makes an action of pinching by touching a thumb and an index finger, or an action of separating the thumb and the index finger. The camera 10 can capture an action or a state of the hand or finger of the user. The black plate corresponds to a background part of an image obtained by capturing the hand or finger other than the hand or finger, but in this embodiment, the black plate is inessential. In addition, a color of the plate is not limited to black, and may be any color. However, to make a part corresponding to the hand or finger in the image obtained by capturing the hand or finger stand out against the background, it is preferable that the plate has a single color and does not include a complex pattern.

The image processing device 50 can display an image of the hand or finger captured by the camera 10 without change, or an image obtained by processing the image of the hand or finger on the display screen of the display device 20. When the user moves the hand or finger in a horizontal direction with respect to the black plate, the hand or finger displayed on the display screen can also move in the horizontal direction (vertically and horizontally) on the display screen. In addition, when the user moves the hand or finger in a vertical direction with respect to the black plate, the hand or finger displayed on the display screen also changes so that the hand or finger virtually moves in the vertical direction with respect to the display screen. The image obtained by processing the image of the hand or finger is, for example, an image that displays symbols such as dots and circles instead of the hand or finger.

As illustrated in FIG. 1, when the user pinches the thumb and the index finger on a numeric key desired to be input by the user, the image processing device 50 determines that the numeric key has been selected by pinching of the thumb and the index finger, and displays a number in a numeric input field on the display screen of the display device 20. As illustrated in FIG. 1, a numeric keypad has, in addition to numeric keys 0 to 9, a delete key indicated by "DEL" and a clear key indicated by "CLR".

Figure 2:
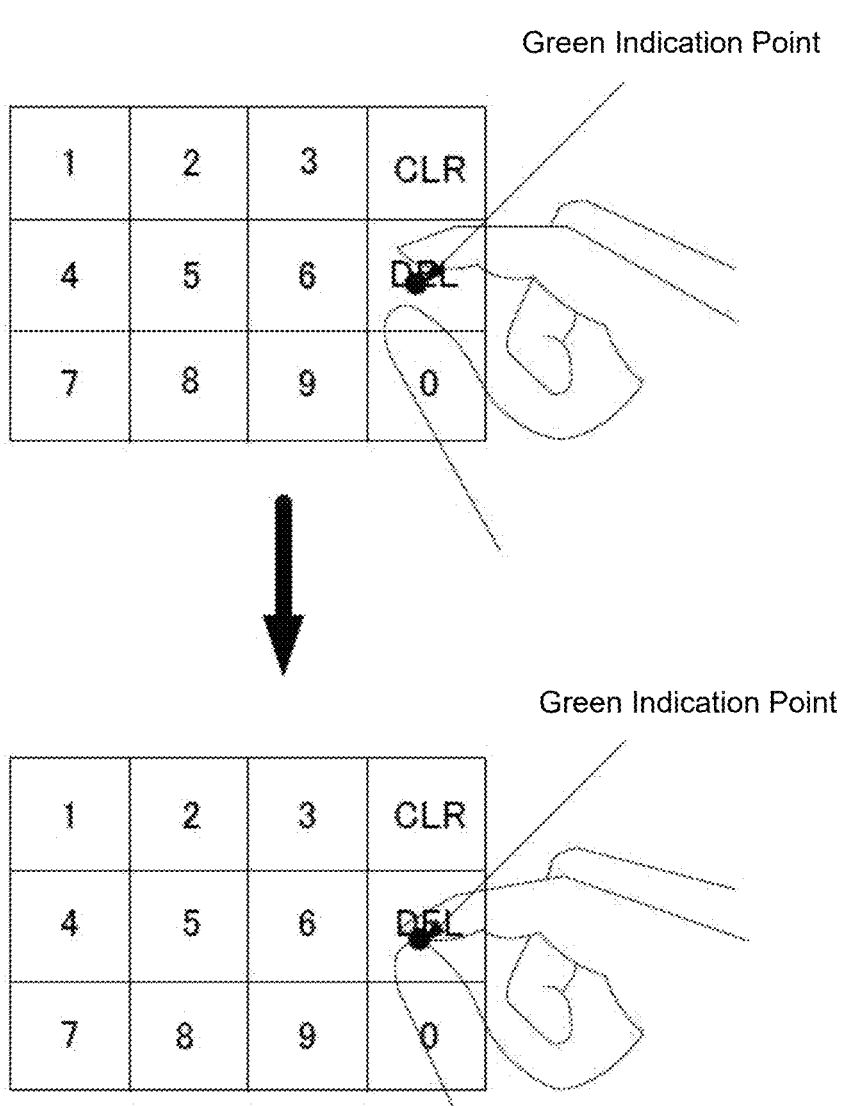
FIG. 2 is a diagram illustrating an example of an action of a hand or finger.

FIG. 2 is a diagram illustrating an example of an action of the hand or finger. FIG. 2 illustrates an action of selecting a numeric key by pinching the thumb and the index finger. In a state in which the thumb and the index finger are separated from each other, a pointer position (for example, a green indication point) is displayed between the thumb and the index finger. By placing the pointer position on a key to be selected (the delete key in the figure) and pinching the thumb and the index finger, the delete key is selected and "2" of the number "9632" in the numeric input field on the display screen of FIG. 1 can be deleted. By providing the pointer position between the thumb and the index finger, selection becomes easy even when the key is small.

FIG. 2 illustrates an example in which numbers are displayed in the numeric input field on the display screen of display device 20 by pinching the thumb and the index finger using a right hand. However, numbers may also be displayed in the numeric input field on the display screen of display device 20 by pinching the thumb and the index finger using a left hand.

The action of putting the thumb and the index finger into contact and pinching with the fingertips is a familiar action suitable for a selection operation, and therefore, in this embodiment, a pinching action with the fingertips using the thumb and the index finger is used as a selection action. In this embodiment, an object represented by the fingertips is referred to as an indicator, and a hand or finger is taken as an example of the indicator. In particular, and the thumb and the index finger (a first finger and a second finger) are taken as examples. In this case, the fingertips of both the thumb and index finger, which correspond to ends of the indicator, are taken as fingertip positions that represent the positions of the fingertips as a single unit, and the pointer position is determined based on the fingertip positions.

The pointer position can be determined based on the fingertip positions. The pointer position may be determined, for example, within a range from tips of two fingers (for example, the thumb and the index finger) to first joints, or more preferably, within a range from the inside of the two fingers to bases of nails, and the two fingers may be fingers other than the thumb and the index finger. The pointer position will be specifically described below.

Figure 3:
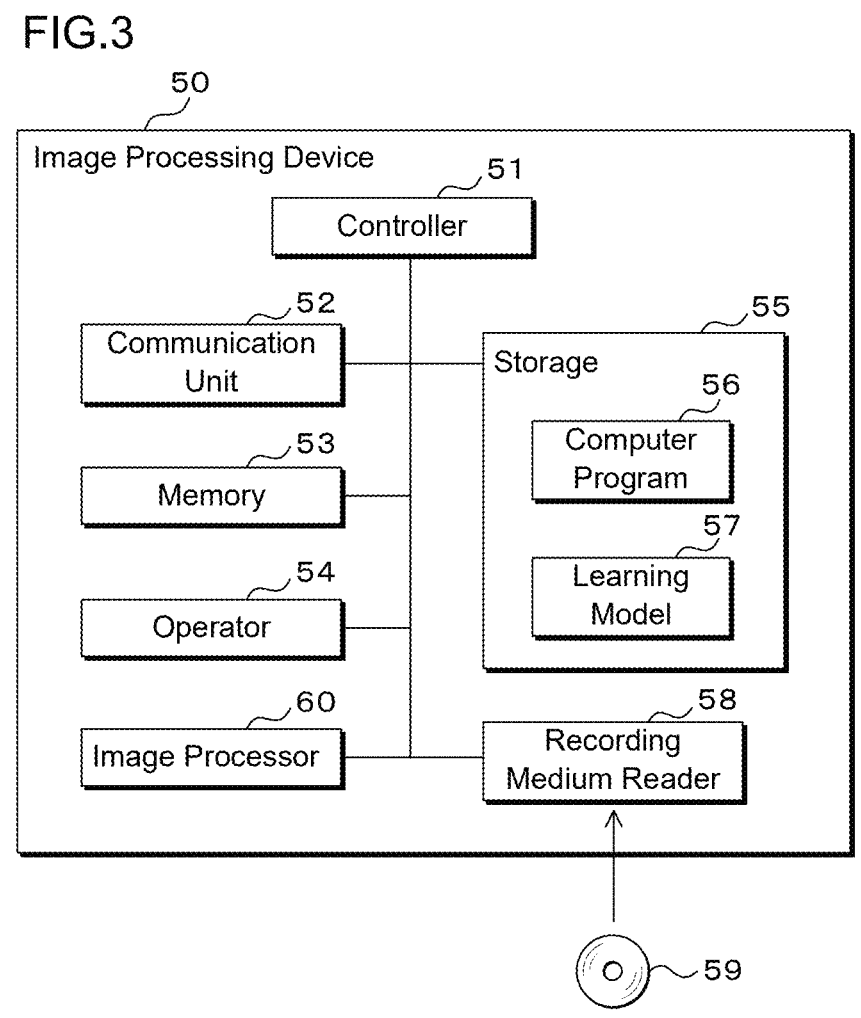
FIG. 3 is a diagram illustrating an example of a configuration of an image processing device.

FIG. 3 is a diagram illustrating an example of a configuration of the image processing device 50. The image processing device 50 includes a controller 51 that controls the entire device, a communication unit 52, a memory 53, an operator 54, a storage 55, a recording medium reader 58, and an image processor 60. The storage 55 can include, for example, a hard disk or a semiconductor memory, and stores a computer program 56, a learning model 57, and required information. Note that the image processing device 50 may be configured as a plurality of devices by distributing processing functions.

The controller 51 is configured by incorporating a required number of CPUs (Central Processing Units), MPUs (Micro-Processing Units), GPUs (Graphics Processing Units), etc. The controller 51 can execute processing defined by the computer program 56. That is, processing by the controller 51 is also processing by the computer program 56. The controller 51 can execute functions of the image processor 60 by executing the computer program 56. The image processor 60 may be configured as hardware, may be realized as software, or may be realized as a combination of hardware and software. The controller 51 and the image processor 60 can perform processing using the learning model 57.

The communication unit 52 includes, for example, a communication module, and can communicate with the display device 20. The communication unit 52 may include a communication interface function with respect to the camera 10 or other interface devices.

The memory 53 can include a semiconductor memory such as a static random access memory (SRAM), a dynamic random access memory (DRAM), or a flash memory. By loading the computer program 56 in the memory 53, the controller 51 can execute the computer program 56.

A recording medium 59 on which the computer program 56 is recorded can be read by the recording medium reader 58. Note that the computer program 56 may be downloaded from an external device via the communication unit 52 and stored in the storage 55.

The operator 54 has an interface function with respect to input devices such as a mouse and a keyboard.

Figure 4:
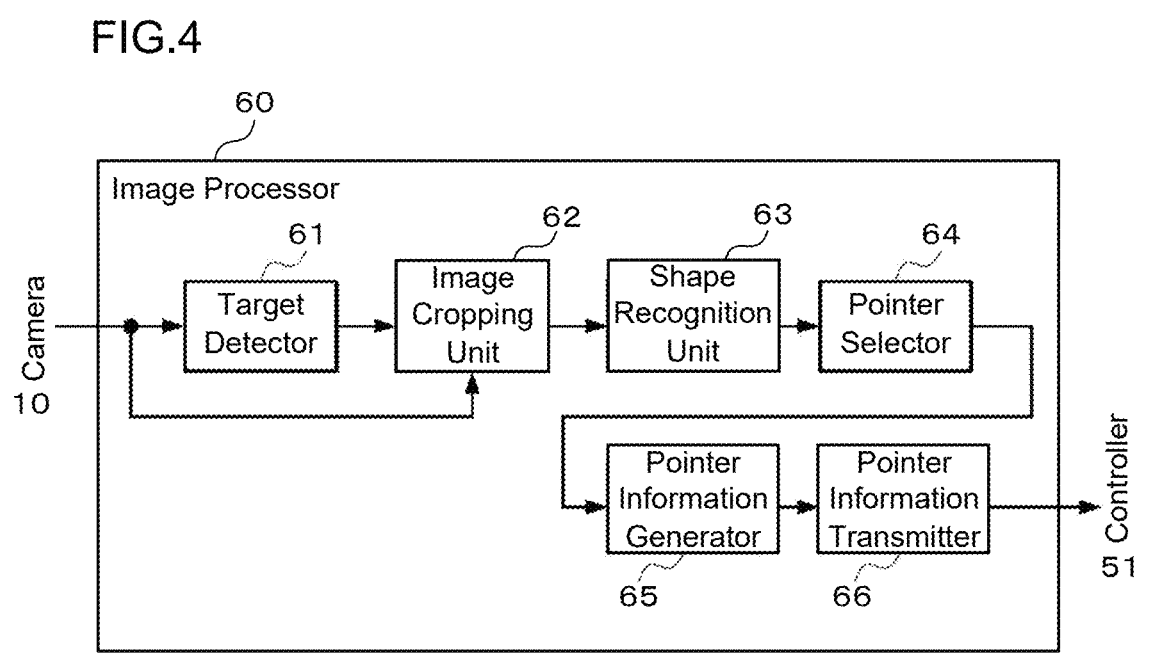

FIG. 4 is a diagram illustrating an example of a configuration of the image processor 60. The image processor 60 has a function for realizing a function of the non-contact user interface, and specifically, includes a target detector 61, an image cropping unit 62, a shape recognition unit 63, a pointer selector 64, a pointer information generator 65, and a pointer information transmitter 66. The processing by the image processor 60 is performed similarly on a general image obtained by visible light or infrared light, and on a distance image obtained by a TOF camera.

The target detector 61 acquires an image of the hand or finger (an image in which a plurality of indicators is captured) captured by the camera 10. The target detector 61 detects the thumb and the index finger, which are target parts, based on the image of the hand or finger, and outputs positions of the fingertips on the image and a size of a region including the fingertips.

Figure 5:
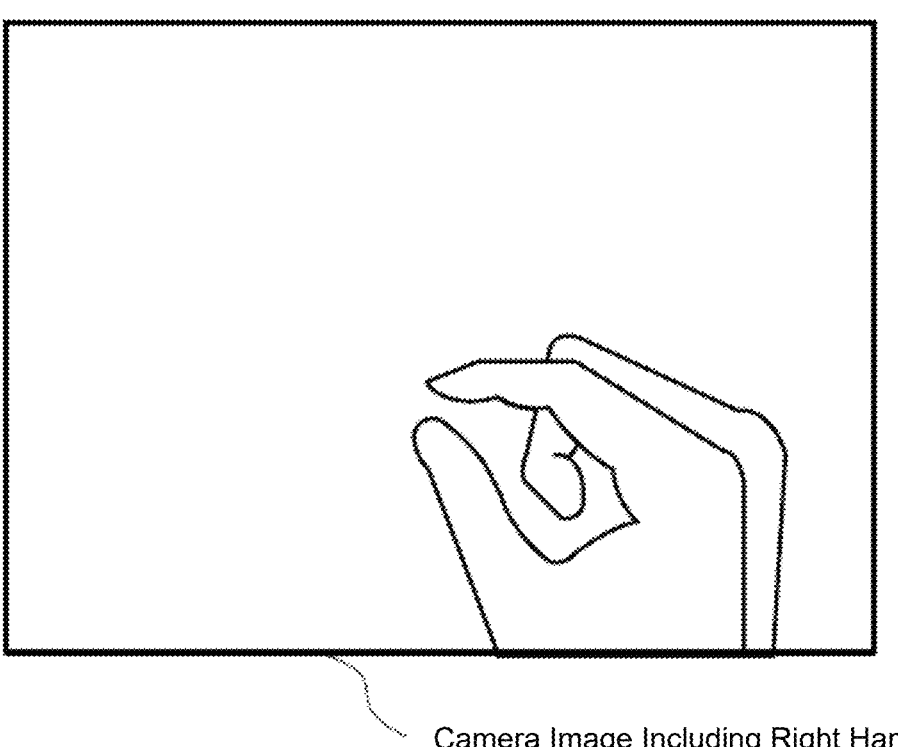
FIG. 5 is a diagram illustrating an example of an image of the hand or finger.

FIG. 5 is a diagram illustrating an example of an image of the hand or finger. FIG. 5 illustrates an example of an image of the right hand, but an image of the left hand may also be used. A region other than the hand or finger is the background, and is black when the black plate is used. When a plate is not used, the image may be processed so that a part other than the hand or finger has a single color (for example, white, gray, etc.).

The target detector 61 performs a search along two diagonal search axes in different directions on the image of the hand or finger to detect the fingertips. By performing a search using the two search axes, a search is performed by scanning the right hand in a lower right direction and scanning the left hand in a lower left direction, and a first detected point can be regarded as a fingertip.

Figure 6:
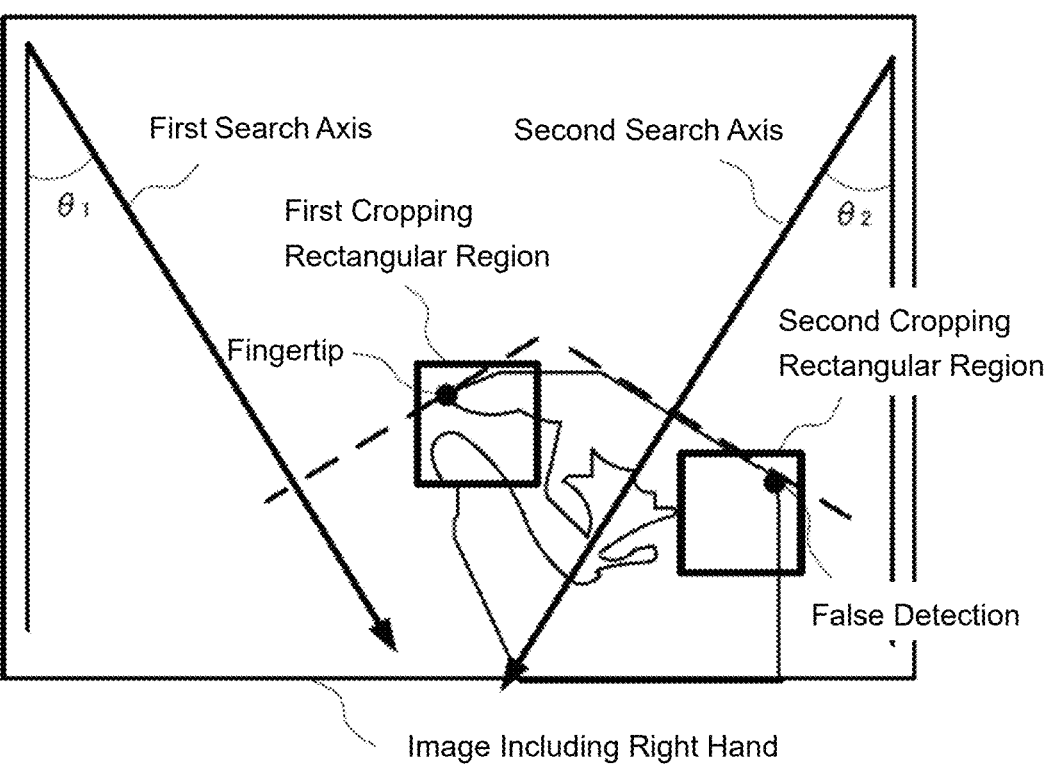
FIG. 6 is a diagram illustrating a method of searching for a fingertip of a right hand.
Figure 7:
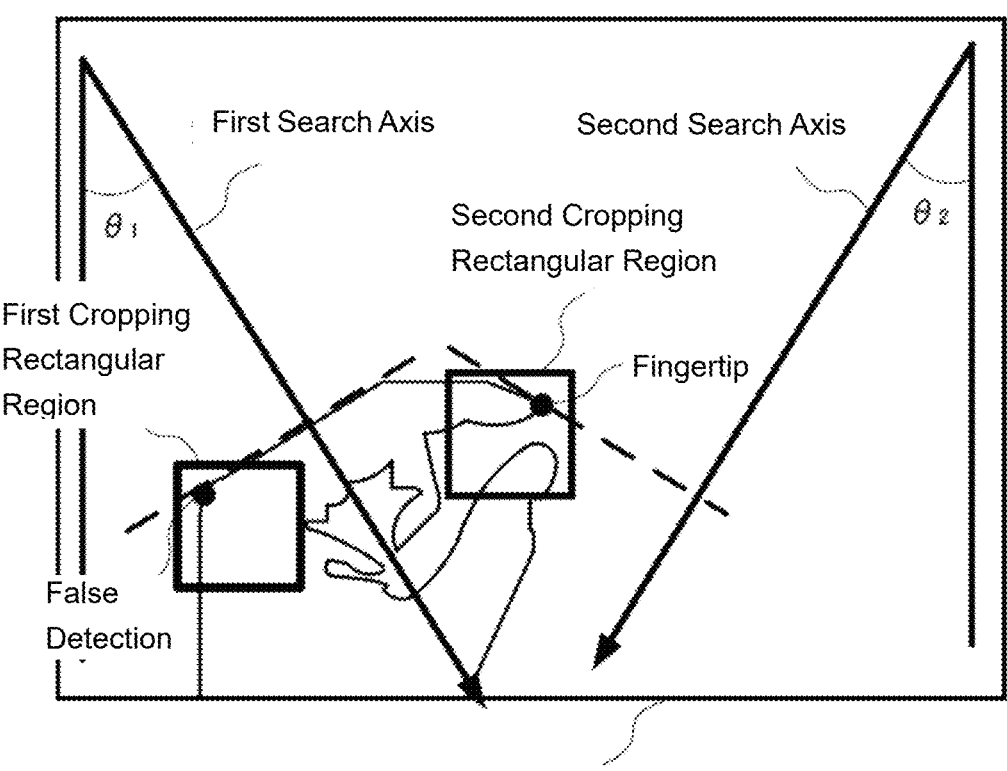
FIG. 7 is a diagram illustrating a method of searching for a fingertip of a left hand.

FIG. 6 is a diagram illustrating a method of searching for a fingertip of the right hand, and FIG. 7 is a diagram illustrating a method of searching for a fingertip of the left hand. A first search axis is an axis directed diagonally downward to the right and forms an angle θ1 with a vertical direction on the image. A second search axis is an axis directed diagonally downward to the left and forms an angle θ2 with a vertical direction on the image. As illustrated in FIG. 6, when searching the image of the right hand using the first search axis, it is determined whether or not a fingertip is present along a direction perpendicular to a search point of the first search axis. When no fingertip is present, the search point is moved along the first search axis, and when a similar process is repeated, the fingertip of the right hand can be detected. Further, as illustrated in FIG. 7, when searching the image of the left hand using the second search axis, it is determined whether or not a fingertip is present along a direction perpendicular to a search point of the second search axis. When no fingertip is present, the search point is moved along the second search axis, and when a similar process is repeated, the fingertip of the left hand can be detected. When a search is performed using the two search axes in this way, it is possible to detect fingertips on both the right and left hands (detected positions of the fingertips are indicated by black dots in FIGS. 6 and 7).

On the other hand, when the image of the right hand is searched using the second search axis, or when the image of the left hand is searched using the first search axis, a part that is not a fingertip (detected position is indicated by a black dot) is detected (false detection). However, a part other than the fingertip can be excluded by processing of the pointer selector 64 described later. To search for the fingertip along the search axis, angles θ1 and θ2 of the search axis may be set to a required range including 60° (for example, about 45° to) 75°.

The target detector 61 outputs the detection position of the fingertip on the image detected by searching using the two search axes, the first search axis and the second search axis, and the size of the region including the fingertip to the image cropping unit 62. The size is a predetermined value, and defines a region to be cropped by the image cropping unit 62. A first cropping rectangular region and a second cropping rectangular region illustrated in FIGS. 6 and 7 correspond to the region to be cropped by the image cropping unit 62. Note that the number of search axes may be three or more, and for example, three search axes may be used, each of which is 60° from the right and left and 0° from directly above.

The image cropping unit 62 cuts out a partial image including the fingertip from the image of the hand or finger output from the camera 10 based on the detected position of the fingertip and the size of the region including the fingertip output from the target detector 61. Two cut out partial images are partial images including a first cut out rectangular region and a second cut out rectangular region of FIG. 6 or 7, respectively. The image cropping unit 62 outputs the partial images to the shape recognition unit 63.

The shape recognition unit 63 performs shape recognition processing using the learning model 57. When a partial image is input, the shape recognition unit 63 classifies a shape of the hand or finger shown in the partial image, and outputs the classified shapes and the detected positions of the fingertips. The learning model 57 is a model using a machine-learned algorithm, and can use, for example, an SVM (support vector machine), a decision tree, a random forest, a neural network, etc. As a model using deep learning, for example, a CNN (convolutional neural network) can be used, and examples of the structure include AlexNet, VGG, GoogLeNet, and ResNet.

FIG. 8 is a diagram illustrating an example of classification of the shape of the hand or finger. FIG. 8 illustrates classification of shapes by the shape recognition unit 63. As illustrated in FIG. 8, shapes can be classified into 13 classes such as classes 0, 1, 2, . . . , 12. Note that the number of classes and contents of the shapes are not limited to the example of FIG. 8.

In class 0, the shape of the hand or finger is in a state in which the thumb and the index finger are separated from each other, and class 0 indicates that the pointer is in a non-selected state. In class 1, the shape of the hand or finger is in a state in which the tip of the thumb and the tip of the index finger are in contact, and class 1 indicates that the pointer is in a selected state. Note that the thumb and the index finger are indicators, the non-selected state is a state before pointing, and the selected state is a state of pointing.

In classes 2 and 3, the shape of the hand or finger is in a state of a single thumb or index finger, indicating a state of not being a pointer (non-pointer). In classes 4 and 5, the shape of the hand or finger is in a state of two fingers of the index finger and a middle finger, indicating a state of not being a pointer. Note that, in class 4, there is a gap between the two fingers, and in class 5, there is no gap between the two fingers. In classes 6 and 7, the shape of the hand or finger is in a state of three fingers of the index finger, the middle finger, and a ring finger, indicating a state of not being a pointer. In class 6, there are gaps among the three fingers, and in class 7, there is no gap among the three fingers. In class 8, the shape of the hand or finger is in a state of four fingers of the index finger, the middle finger, the ring finger, and a little finger, indicating a state of not being a pointer. In class 9, an angle is from a side of a base of a finger, which is in a state of not being a pointer (non-pointer). In class 10, the shape of the hand or finger is in a state of clenched first, indicating a state of not being a pointer. Class 11 indicates the shape of the hand or finger other than classes 0 to 10, indicating a state of not being a pointer. Class 12 indicates a shape other than the hand or finger, indicating a state of not being a pointer. Note that, even though each of classes 0 and 1 indicates a partial image of the thumb and the index finger in FIG. 8, a partial image of the thumb and the index finger of the left hand can be similarly classified.

The pointer selector 64 extracts only a part having a shape corresponding to a pointer shape from a partial image based on a classified shape and a detected position of a fingertip output by the shape recognition unit 63, and outputs a class corresponding to a pointer and a position of the fingertip. In this embodiment, only class 0 and class 1 are used as pointers, and when another class shape is output from the shape recognition unit 63, the pointer selector 64 ignores output of the shape recognition unit 63 and does not output anything. In this way, all fingertips erroneously detected by the target detector 61 can be deleted.

The pointer information generator 65 generates information (information indicating the state of the pointer) indicating whether the pointer is in a selected state or a non-selected state depending on whether the class output from the pointer selector 64 is class 0 or class 1, and outputs information indicating the position of the pointer based on the position (detection position) of the fingertip and the state of the pointer. The pointer position (the position of the green indication point between the thumb and the index finger) illustrated in FIG. 2 can be determined by the pointer information generator 65. The pointer information transmitter 66 outputs pointer information indicating the position of the pointer and the state of the pointer to the controller 51. The controller 51 provides information indicating the state of the pointer to an application, etc. In this way, display information such as a symbol is generated. Alternatively, the controller 51 can output the pointer information to a host device, etc. outside the non-contact user interface.

As described above, the controller 51 (or the image processor 60) can input the image of the hand or finger to a learning model (shape recognition unit 63) generated to output classification information including a first shape (class 1) in which a first finger and a second finger are in contact or a second shape (class 0) in which the first finger and the second finger are separated from each other when the image of the hand or finger is input, and switch a display mode of a pointer located between a tip of the first finger and a tip of the second finger depending on the classification information output by the learning model.

Embodiment 2

In Embodiment 1 described above, the pointer position is determined by defining the tip of the fingertip detected by the target detector 61 as the fingertip position. In Embodiment 2, detection of the fingertip position according to the subjective opinion of the user (human) will be described.

Figure 9A:
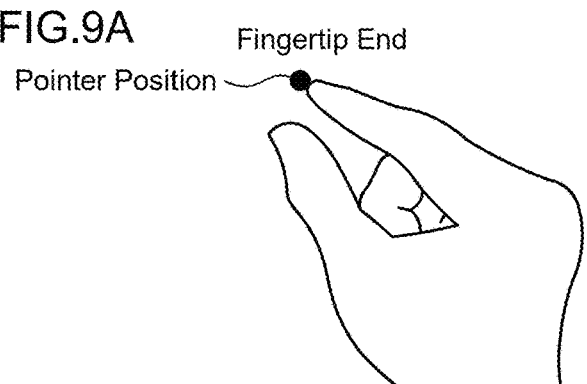
FIG. 9A is a diagram illustrating an example of a combination of a fingertip position and a pointer position.
Figure 9B:
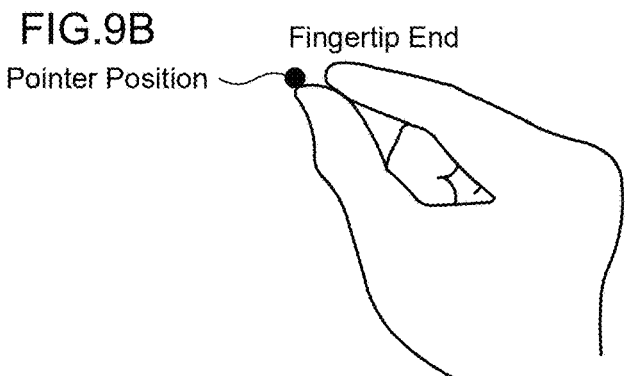
FIG. 9B is a diagram illustrating an example of a combination of a fingertip position and a pointer position.

FIGS. 9A, 9B, 9C, and 9D are diagrams each illustrating an example of a combination of the fingertip position and the pointer position. FIG. 9A is a state in which the thumb and the index finger are separated from each other, FIG. 9B is a state in which the thumb and the index finger are in contact, and FIGS. 9A and 9B each illustrate a state in which a tip of one of the two fingertips is set as the fingertip position and a pointer is placed over the tip (set as the pointer position). In the case of FIGS. 9A and 9B, the pointer position is present at the tip of one of the fingers, which creates an uncomfortable feeling for the user. Furthermore, the position of the pointer changes relatively significantly depending on which tip of the two fingers is selected as the fingertip position, which further creates an uncomfortable feeling for the user.

Figure 9C:
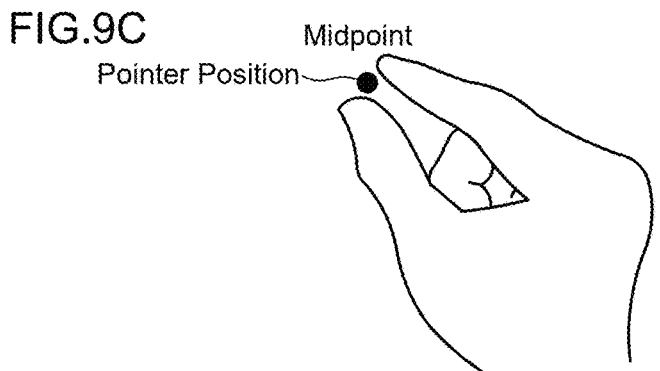
FIG. 9C is a diagram illustrating an example of a combination of a fingertip position and a pointer position.
Figure 9D:
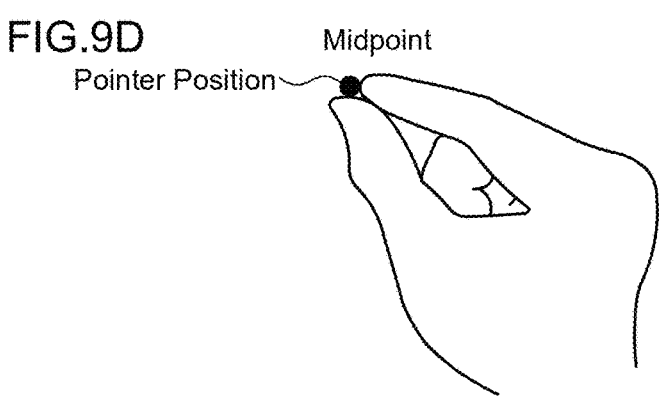
FIG. 9D is a diagram illustrating an example of a combination of a fingertip position and a pointer position.

On the other hand, by placing the fingertip position between the two fingers as illustrated in FIGS. 9C and 9D, the problem of the pointer position changing relatively significantly can be solved to eliminate the uncomfortable feeling of the user. Further, when compared to the case where the tip of one of the two fingertips is set as the fingertip position, the uncomfortable feeling is extremely small, and the fingertip position can be set according to the subjective opinion of the user. A specific description will be given below.

Figure 10:
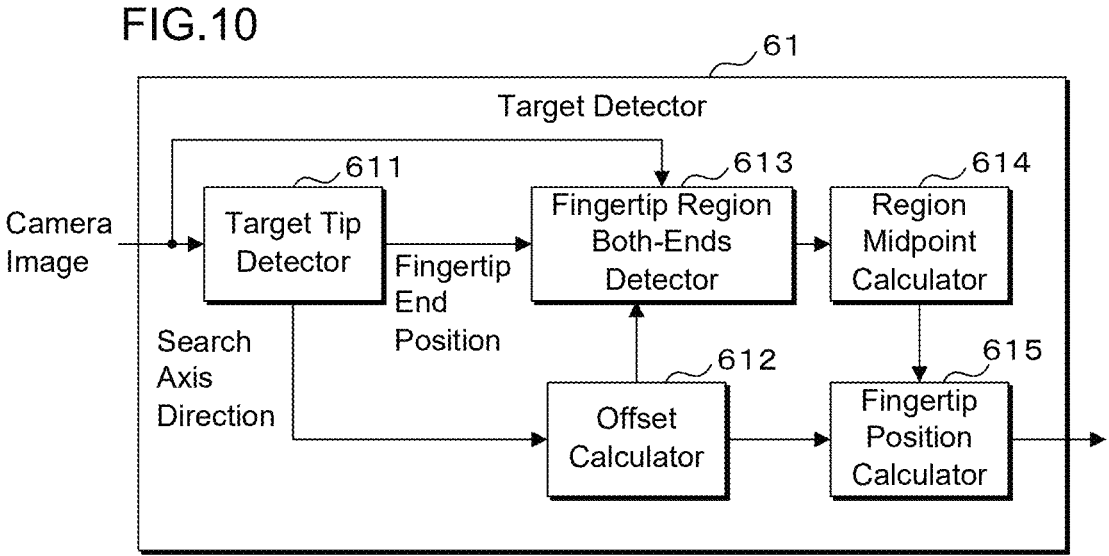
FIG. 10 is a diagram illustrating an example of a configuration of a target detector of Embodiment 2.
Figure 11:
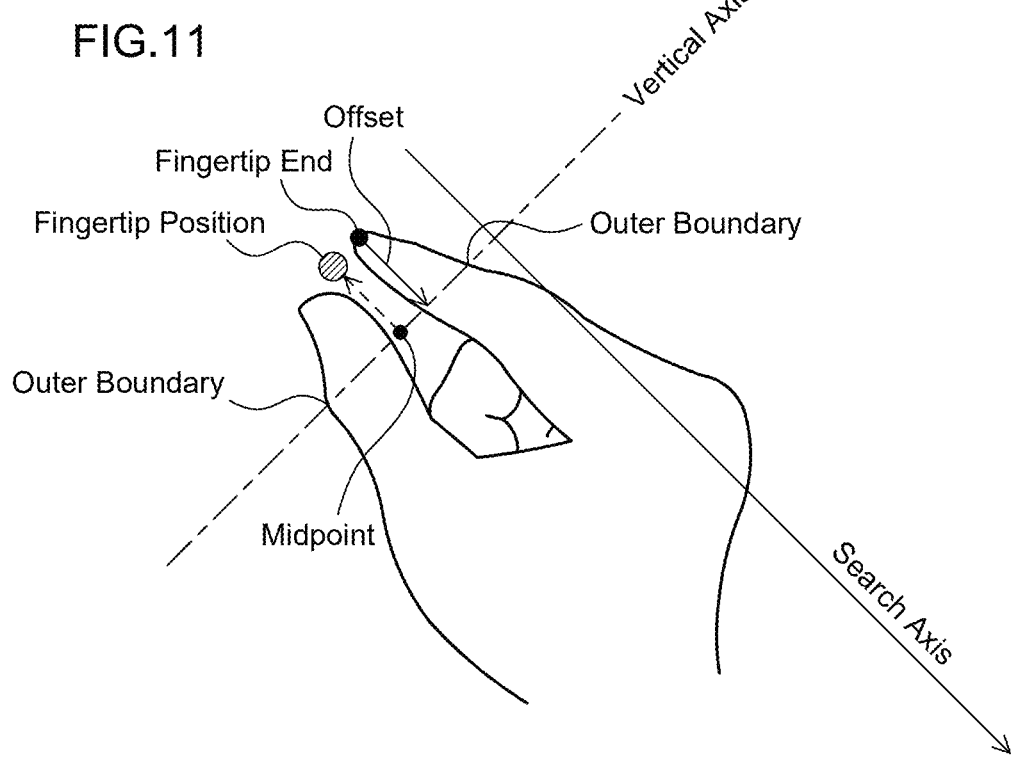
FIG. 11 is a diagram illustrating a method of determining a midpoint of two fingers.

FIG. 10 is a diagram illustrating an example of a configuration of the target detector 61 of Embodiment 2, and FIG. 11 is a diagram illustrating a method of determining a midpoint of two fingers. The target detector 61 includes a target tip detector 611, an offset calculator 612, a fingertip region both-ends detector 613, a region midpoint calculator 614, and a fingertip position calculator 615.

The target tip detector 611 searches the image of the hand or finger acquired from the camera 10 in a search axis direction, detects a fingertip corresponding to an uppermost stream side in the search axis when a plurality of fingertips is present on the image, and outputs a detected fingertip end position (coordinates on the image) to the fingertip region both-ends detector 613. In an example of FIG. 11, there are two fingertips of the thumb and the index finger, and the fingertip of the index finger, among the thumb and the index finger, on the uppermost stream side in the search axis is detected as the fingertip end.

The offset calculator 612 calculates an offset vector (a vector indicated as "offset" of FIG. 11) by multiplying a unit vector in the search axis direction by a predetermined coefficient based on information in the search axis direction used by the target tip detector 611.

The fingertip region both-ends detector 613 sets a vertical axis in a direction (vertical direction) perpendicular to the search axis, passing through an end point obtained by adding an offset vector with the fingertip end position as a start point, and detects an outer boundary of each of the thumb and the index finger (boundaries of both ends of a finger region including the thumb and the index finger) on the set vertical axis. In FIG. 11, the outer boundary of the thumb and the outer boundary of the index finger are detected on the vertical axis.

The region midpoint calculator 614 calculates the position (coordinates) of the midpoint of the outer boundary (boundaries of both ends).

The fingertip position calculator 615 determines, as a designated position, a position represented by the ends of the first indicator and the second indicator between the end of the first indicator and the end of the second indicator, which are specified based on the acquired image. A pointer can be set based on this fingertip position.

Specifically, the fingertip position calculator 615 uses the midpoint calculated by the region midpoint calculator 614 as a start point, and subtracts the offset vector calculated by the offset calculator 612 to calculate an end point as the fingertip position. In FIG. 11, the fingertip position is set at a position between the tip of the thumb and the tip of the index finger. Specifically, the fingertip position is set at the midpoint between the tip of the thumb and the tip of the index finger. The position of the pointer may be set to the set fingertip position.

As described above, the controller 51 (or the image processor 60) can acquire an image in which a plurality of indicators is captured, and set a pointer that designates a position represented by the ends of the first and second indicators at a position between the end of the first indicator and the end of the second indicator specified based on the acquired image. In this case, the image in which the plurality of indicators is captured may be an image captured by the TOF camera.

More specifically, the image in which the plurality of indicators is captured is an image of the hand or finger, the end of the first indicator and the end of the second indicator are the tip of the first finger and the tip of the second finger, and the controller 51 (or image processor 60) can set a pointer at a middle position between the tip of the first finger and the tip of the second finger.

By placing the fingertip position between the two fingers, the problem of the pointer position changing relatively significantly depending on which of the plurality of fingers is selected to set a fingertip thereof as the pointer can be resolved, thereby eliminating the uncomfortable feeling of the user. In addition, when compared to the case where a tip of one of the two fingertips is used as the fingertip position, the uncomfortable feeling is extremely small, and the fingertip position can be set according to the subjective opinion of the user.

In addition, the controller 51 (or the image processor 60) can search the acquired image of the hand or finger along a search axis in a predetermined direction to detect the tip of the fingertip, set a perpendicular axis perpendicular to the search axis at a predetermined distance from the detected tip, perform a search along the set perpendicular axis to detect an outer boundary of each of a first finger and a second finger, specify a midpoint of the detected outer boundaries, and set a pointer based on the specified midpoint.

For example, the controller 51 (or the image processor 60) may set the pointer at a position offset from the specified midpoint by a predetermined distance in a direction parallel to the search axis. In this way, it is possible to set a pointer position providing a more natural feel to the user.

The controller 51 (or the image processor 60) can display the set fingertip position on an application screen displayed on the display device 20. In this case, the fingertip position may be displayed on the application screen by composing a symbol such as a dot or a circle representing the fingertip position with an image of a fingertip part of the image acquired from the camera 10, or only a symbol such as a dot or a circle representing the fingertip position may be displayed on the application screen. In addition, the entire image of the hand or finger acquired from the camera 10 may be overlaid and displayed semi-transparently. The overlaid image is not the image of the hand or finger acquired from the camera 10, and a representative fingertip image (actual photograph or drawing) prepared in advance may be selected according to the shape of the recognized fingertip and displayed. The image of the hand or finger acquired from the camera 10 may be displayed small on a part of the display screen as a wipe image.

Figure 12:
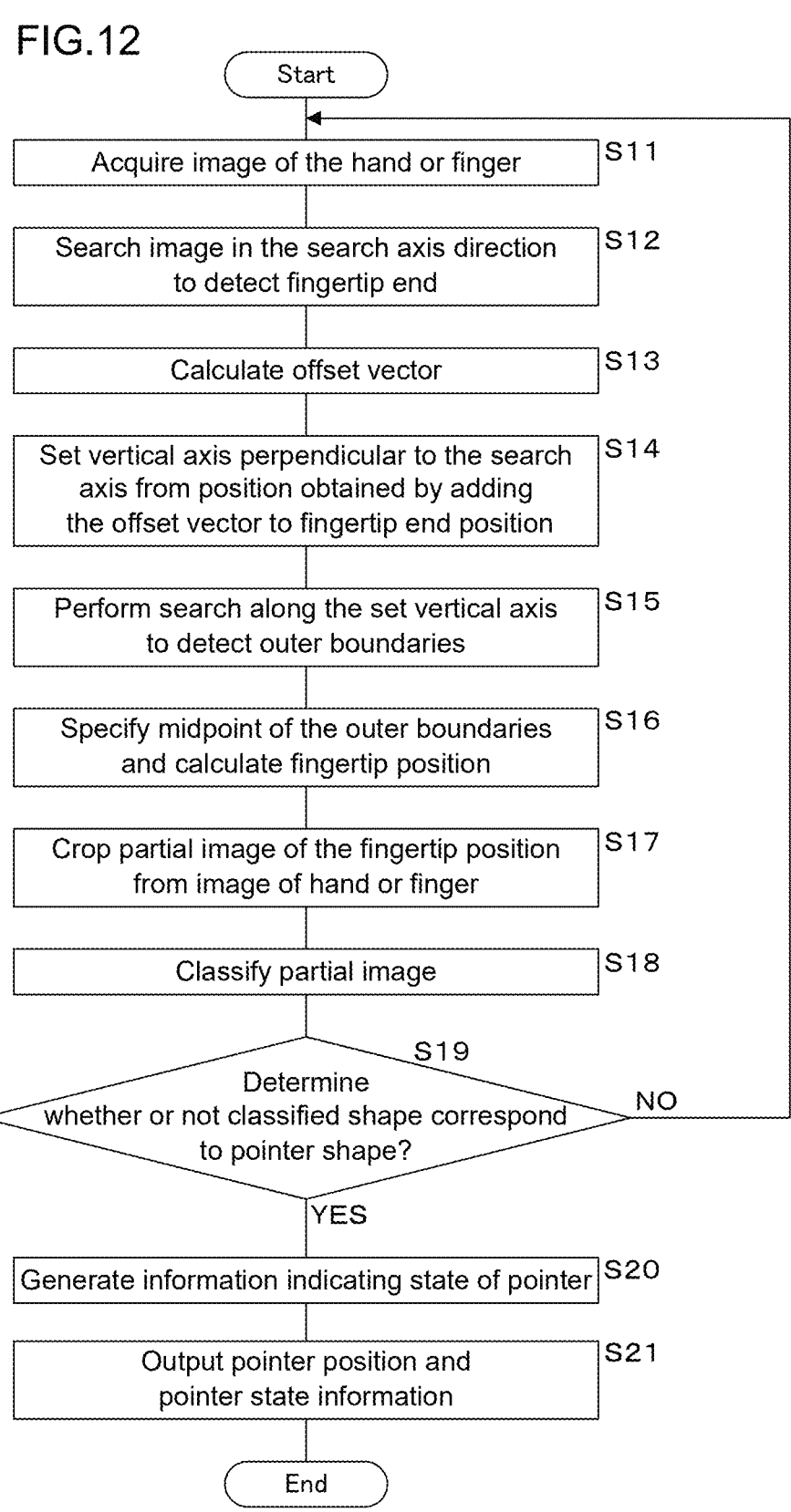
FIG. 12 is a diagram illustrating an example of a processing procedure of an image processor of Embodiment 2.

FIG. 12 is a diagram illustrating an example of a processing procedure of the image processor 60 of Embodiment 2. In the following, for convenience, the subject of the processing is described as the image processor 60. The image processor 60 acquires an image of the hand or finger from the camera 10 (S11), and searches the acquired image in the search axis direction to detect the fingertip end (S12). The image processor 60 calculates an offset vector along the search axis direction (S13). The image processor 60 sets a vertical axis perpendicular to the search axis from a position obtained by adding the offset vector to the fingertip end position (S14).

The image processor 60 performs a search along the set vertical axis to detect outer boundaries (boundaries of both ends) of the fingers (for example, two fingers of the thumb and the index finger) (S15). The image processor 60 specifies a midpoint of the outer boundaries of the two fingers and calculates a fingertip position (S16). The image processor 60 crops a partial image of the fingertip position from the image of the hand or finger (S17).

The image processor 60 classifies the partial image (S18) and determines whether or not a classified shape corresponds to a pointer shape (shape) (S19). When the classified shape does not correspond to the pointer shape (NO in S19), the image processor 60 continues processing from step S11 onwards. When the classified shape corresponds to the pointer shape (YES in S19), the image processor 60 generates information indicating a state of the pointer (information indicating a pointer position and a pointer state) (S20), outputs the generated pointer information (S21), and ends processing.

As described above, according to Embodiment 2, in a state where two fingers are close to each other (separated from each other) without touching each other, when the fingertip position representing the fingertips of the two fingers is set to a position between the two fingers, for example, in the middle of the two fingers, it is possible to set the fingertip position according to the subjective opinion of the user. In this way, it is possible to realize a non-contact user interface according to the subjective opinion of the user.

Embodiment 3

When performing a pinch action, referring to movement of the two fingers, the index finger tends to move more than the thumb. To match a sense of the user moving the hand or finger, it is desirable that the fingertip position does not change significantly before and after the pinch action. Therefore, in Embodiment 3, instead of the configuration in which the fingertip position is set between the two fingers as in Embodiment 2, a description will be given of a configuration in which the fingertip position is set on the thumb, which moves relatively little.

Figure 13:
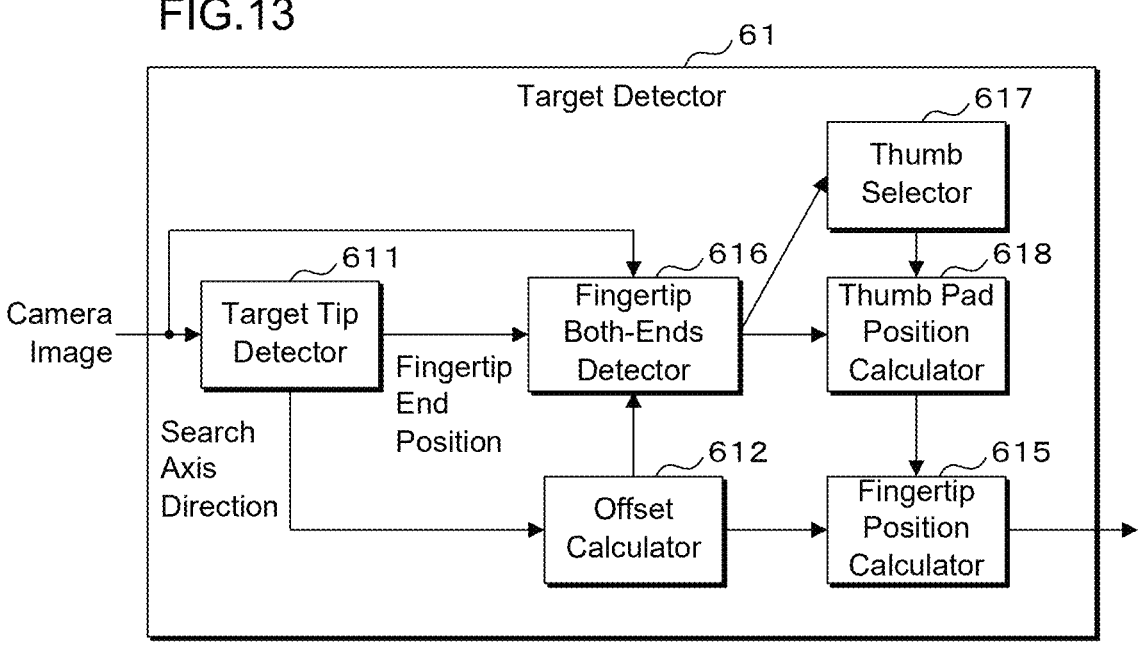
FIG. 13 is a diagram illustrating an example of a configuration of a target detector of Embodiment 3.
Figure 14:
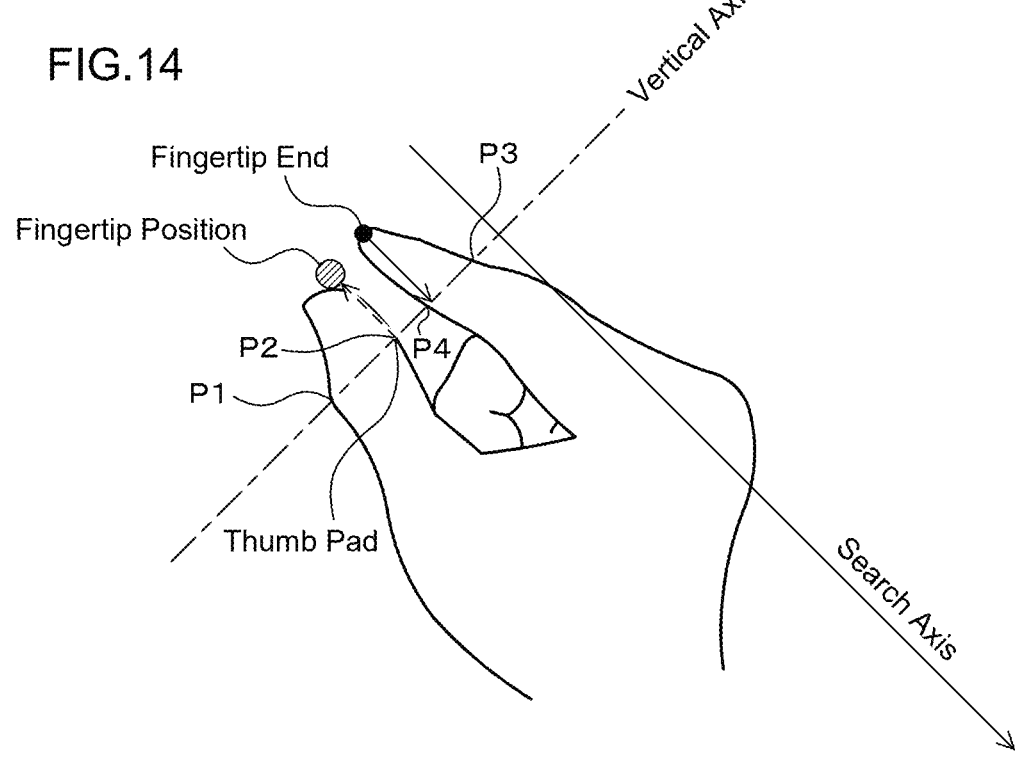
FIG. 14 is a diagram illustrating a method of determining a pad of a thumb.

FIG. 13 is a diagram illustrating an example of a configuration of a target detector 61 of Embodiment 3, and FIG. 14 is a diagram illustrating a method of determining a pad of the thumb. When Embodiment 3 and Embodiment 2 are compared with each other, the target detector 61 includes a fingertip both-ends detector 616, a thumb selector 617, and a thumb pad position calculator 618, instead of the fingertip region both-ends detector 613 and the region midpoint calculator 614. The target tip detector 611, the offset calculator 612, and the fingertip position calculator 615 are similar to those of Embodiment 2.

The fingertip both-ends detector 616 detects boundaries of both ends of each of the two fingers (the thumb and the index finger) by scanning the vertical axis in both directions by a predetermined width. As illustrated in FIG. 14, the fingertip both-ends detector 616 detects boundaries P1 and P2 of both ends of one finger (the thumb) and detects boundaries P3 and P4 of both ends of the other finger (the index finger).

The thumb selector 617 compares distances between two boundaries of the respective two fingers, and selects a finger having a longest distance as the thumb. Since the thumb is generally thicker than the index finger, it is possible to select the thumb based on a distance between boundaries of the finger. In the example of FIG. 14, a distance between the boundaries P1 and P2 is longer than a distance between the boundaries P3 and P4, and thus the finger on the side of the boundaries P1 and P2 can be selected as the thumb.

The thumb pad position calculator 618 determines, as a position of the thumb pad, one of boundaries of both ends (P2 in the example of FIG. 14) closer to the other finger among the boundaries of the both ends of the finger corresponding to the thumb from boundaries on both sides detected by the fingertip both-ends detector 616.

The fingertip position calculator 615 calculates the fingertip position by subtracting the offset vector from a pad position of the thumb (P2 in the example of FIG. 14).

The controller 51 (or the image processor 60) can set a pointer at the pad of the thumb. By setting the fingertip position at the thumb, which has a relatively small movement, it is possible to match a sense of the user moving the hand or finger.

Figure 15:
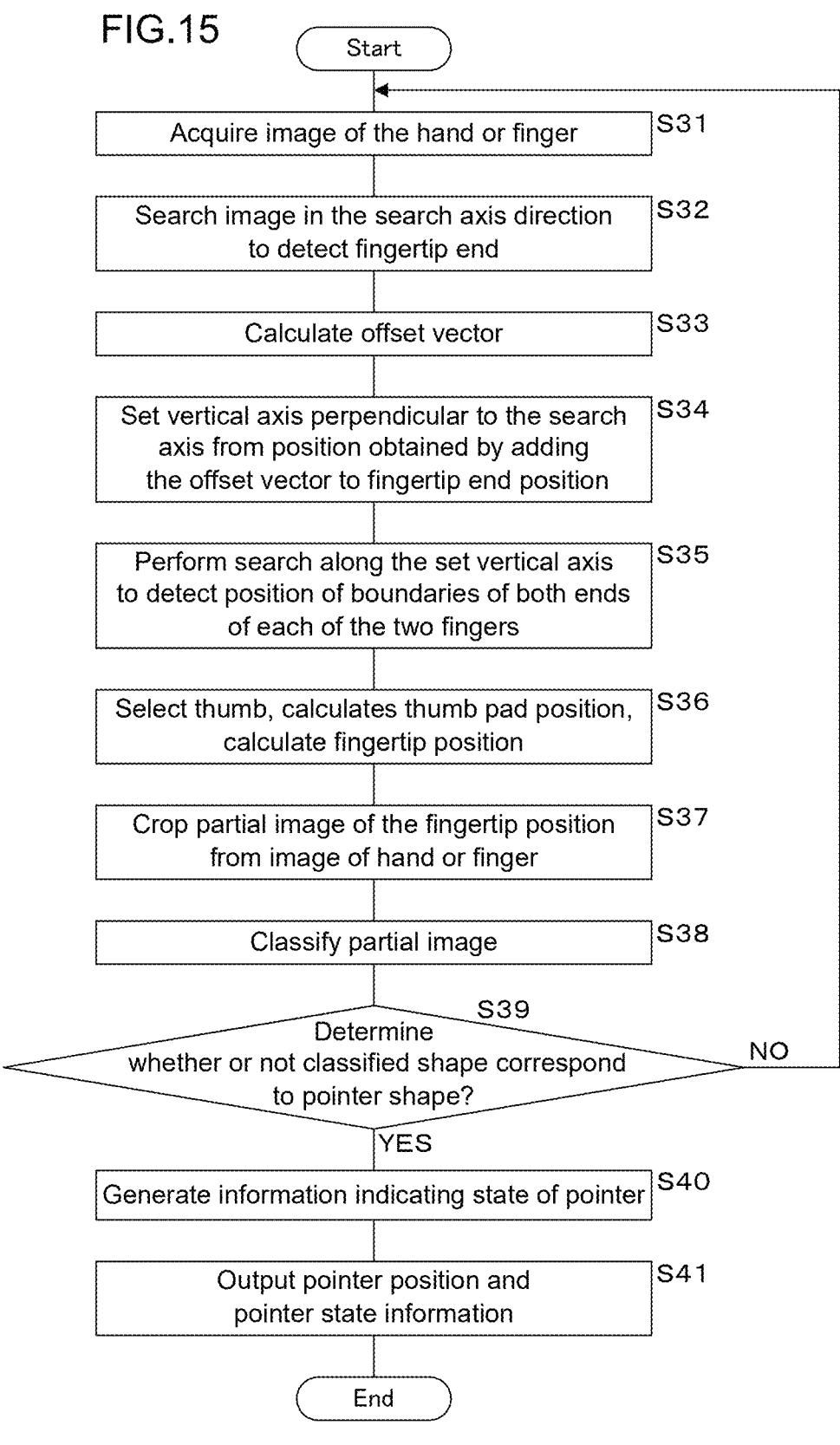
FIG. 15 is a diagram illustrating an example of a processing procedure of an image processor of Embodiment 3.

FIG. 15 is a diagram illustrating an example of a processing procedure of the image processor 60 of Embodiment 3. In the following, for convenience, the subject of the processing is described as the image processor 60. The image processor 60 acquires an image of the hand or finger from the camera 10 (S31), and searches the acquired image in the search axis direction to detect the fingertip end (S32). The image processor 60 calculates an offset vector along the search axis direction (S33). The image processor 60 sets a vertical axis perpendicular to the search axis from a position obtained by adding the offset vector to the fingertip end position (S34).

The image processor 60 performs a search along the set vertical axis to detect positions of boundaries of both ends of each of the two fingers (S35). The image processor 60 compares distances between boundaries of both ends of the respective fingers, selects a finger having a longest distance as the thumb, calculates, as a thumb pad position, boundaries of both ends on a side closer to the other finger among boundaries of the both ends of the finger on a side corresponding to the thumb, and subtracts the offset vector from the thumb pad position, thereby calculating the fingertip position (S36). The image processor 60 crops a partial image of the fingertip position from the image of the hand or finger (S37).

The image processor 60 classifies the partial image (S38) and determines whether or not a classified shape corresponds to a pointer shape (shape) (S39). When the classified shape does not correspond to the pointer shape (NO in S39), the image processor 60 continues processing from step S31 onwards. When the classified shape corresponds to the pointer shape (YES in S39), the image processor 60 generates information indicating a state of the pointer (information indicating a pointer position and a pointer state) (S40), outputs the generated pointer information (S41), and ends processing.

As described above, according to Embodiment 3, in a state where two fingers are close to each other (separated from each other) without touching each other, when the fingertip position representing the fingertips of the two fingers is set based on the pad position of the thumb, change in the fingertip position before and after the pinch action can be made relatively small, and the fingertip position can be set to match the subjective opinion of the user. In this way, it is possible to realize a non-contact user interface according to the subjective opinion of the user.

Application Forms of Embodiments 2 and 3

Figure 16:
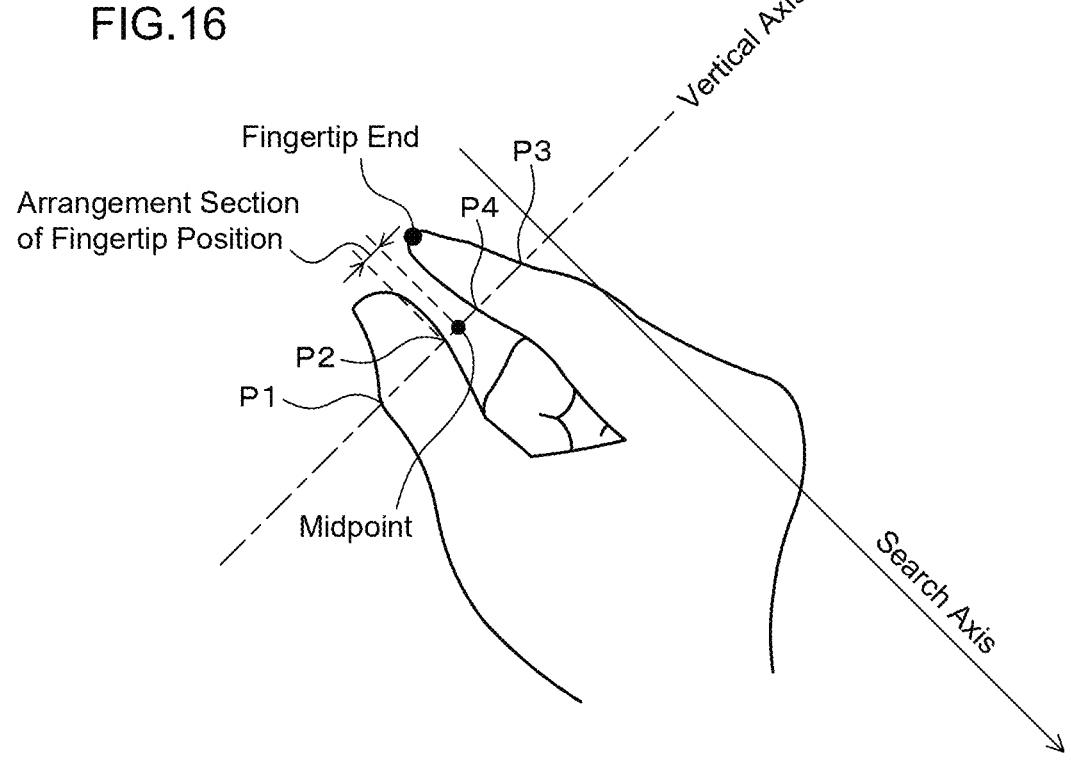
FIG. 16 is a diagram illustrating setting a fingertip position of Application Form 1 of Embodiment 3.

FIG. 16 is a diagram illustrating setting of a fingertip position of Application Form 1 of Embodiment 3. The method of setting the fingertip position illustrated in FIG. 14 is configured to calculate the fingertip position by subtracting the offset vector from the pad position of the thumb (P2 in the example of FIG. 14). In an example illustrated in FIG. 16, a fingertip position is calculated by subtracting an offset vector from a desired position in an arrangement section of a fingertip position between a midpoint on a vertical axis between a boundary P1 of both ends of the thumb and a boundary P3 of both ends of the index finger, and a pad position P2 of the thumb. In this way, it is possible to set the fingertip position while maintaining a balance between the pad position of the thumb and the midpoint according to the subjective opinion of the user.

Figure 17:
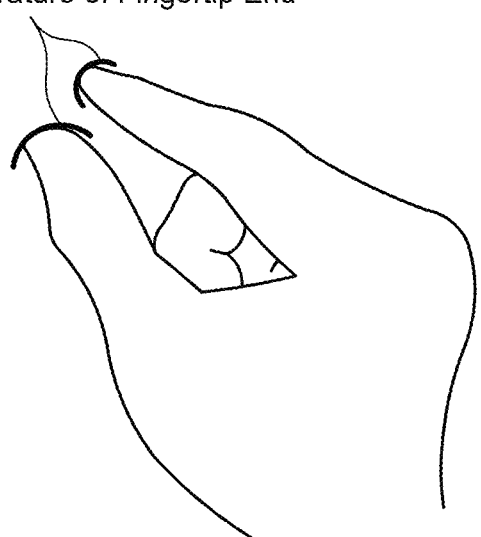
FIG. 17 is a diagram illustrating selection of a thumb of Application Form 2 of Embodiment 3.

FIG. 17 is a diagram illustrating selection of a thumb of Application Form 2 of Embodiment 3. The thumb selection method illustrated in FIG. 14 is configured to compare thicknesses of two fingers (distances between boundaries of both ends). In an example illustrated in FIG. 17, curvatures of tips of two fingers are compared, and a finger having a larger curvature (radius of curvature) is selected as the thumb.

The thumb selector 617 can be configured using a learning model. The learning model is generated through machine learning of the learning model using an image of the tip of the thumb, an image of the tip of the index finger, and training data indicating whether the image is the thumb or the index finger. The thumb may be selected after the skeleton of the entire palm is recognized.

Figure 18:
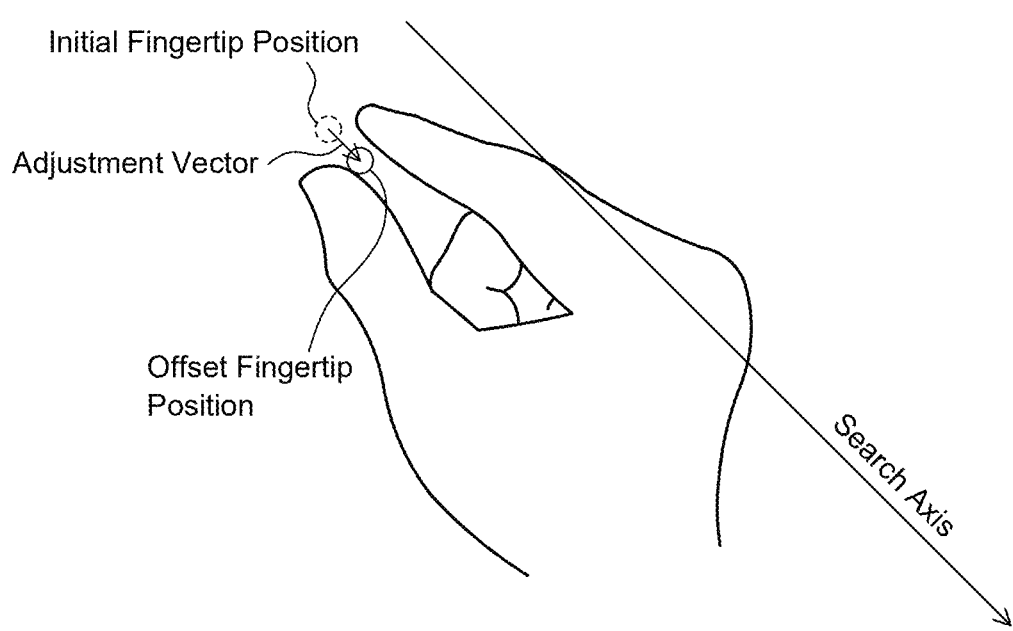
FIG. 18 is a diagram illustrating adjustment of a fingertip position of Application Form 3 of Embodiment 2 or 3.

FIG. 18 is a diagram illustrating adjustment of a fingertip position of Application Form 3 of Embodiment 2 or 3. An end position obtained by adding an adjustment vector (offset vector) for offsetting a position by a required distance in the search axis direction to an initial fingertip position as a start point can be set as an offset fingertip position. By offsetting the fingertip position by the required distance from the initial fingertip position, a pointer position that feels more natural to the user can be set. Note that the required distance to be offset may be a predetermined fixed value, or may be increased or decreased depending on the thickness of the finger or the size of the cropped image (partial image). In addition, to reflect preference of the user, an operation to set the required distance by the user may be accepted.

The controller 51 (or the image processor 60) may accept an operation to set a movement amount for moving the set pointer position to a desired position, thereby allowing the user to set a pointer position that feels more natural.

Furthermore, although not illustrated, the controller 51 (or the image processor 60) may display a plurality of selectable pointer positions as candidate positions and accept an operation to select a pointer position from among the displayed candidate positions. In this way, it is possible to set a pointer position that feels more natural according to preference of each user.

When adjusting the fingertip position, a process of adding an adjustment vector may be performed by the target detector 61 or by the pointer information generator 65. In this case, the target detector 61 outputs information related to the direction of the search axis to the pointer information generator 65. Since the pointer information generator 65 acquires a classification result indicating whether the shape of the hand or finger is class 0 or class 1, for example, when the thumb and the index finger are in contact with each other, it becomes possible to finely adjust the fingertip position according to the shape, such as by reducing the adjustment amount (movement distance).

Embodiment 4

In the above embodiment, a cropped image (partial image) including the recognized fingertip position is input to a learning model used to recognize the shape of the hand or finger. It is desirable from a viewpoint of improving recognition accuracy that the size of the input partial image is equal to the size of the partial image for training used in training the learning model. For example, when a range is extremely narrow and the whole of the hand or finger is not captured, it becomes difficult to determine an object is a fingertip. Conversely, even when the range is extremely wide, the hand or finger (particularly the fingertip) which is a recognition target appears small and is different from a pattern of the partial image used in the training data. On the other hand, the fingertip captured by the camera greatly changes depending on the positional relationship between the fingertip and the camera. When the size of the cropped image is fixed, a spatial range of the fingertip that can be recognized may vary depending on the positional relationship between the camera and the fingertip (the hand or finger). In Embodiment 4, a description will be given of a method of improving accuracy of fingertip shape recognition.

Figure 19:
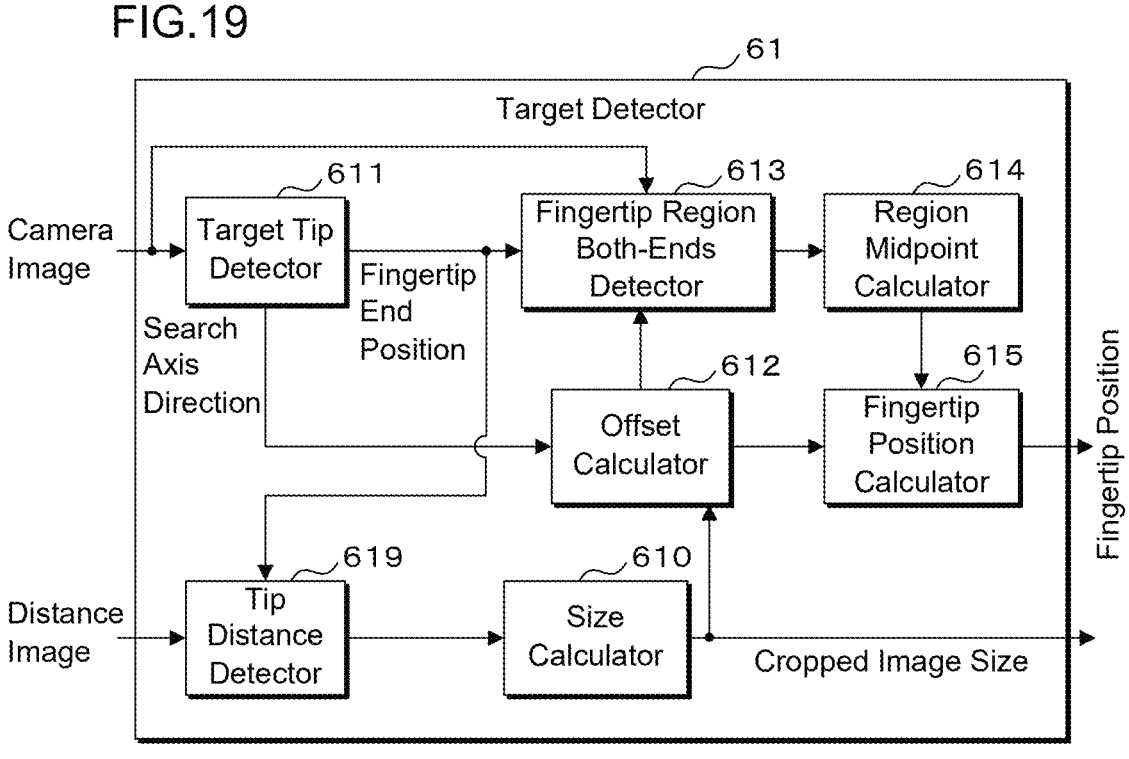
FIG. 19 is a diagram illustrating an example of a configuration of a target detector of Embodiment 4.

FIG. 19 is a diagram illustrating an example of a configuration of a target detector 61 of Embodiment 4. A difference from the target detector 61 of Embodiment 2 illustrated in FIG. 10 is that a tip distance detector 619 and a size calculator 610 are included. The tip distance detector 619 acquires a distance image from the TOF camera (camera 10). The distance image has information about distance for each pixel. When the TOF camera is used, the learning model used by the shape recognition unit 63 may be machine-trained using the distance image instead of the image of the hand or finger. Note that instead of the TOF camera, a distance measuring sensor using laser, sound waves, etc. may be used as long as the distance measuring sensor can measure a distance. However, when using the mentioned ones, it is necessary to use a camera to obtain an image of the hand or finger concurrently therewith.

The tip distance detector 619 acquires information about the tip position detected by the target tip detector 611. The tip distance detector 619 calculates the sum of distances of respective pixels in a region near the tip position on the distance image, calculates an average value of the distances of the region by dividing the calculated sum by the number of pixels in the region, and outputs the calculated average value to the size calculator 610 as a tip distance.

The size calculator 610 calculates the size of the cropped image based on the tip distance obtained from the tip distance detector 619. The cropped image size can be calculated, for example, by multiplying the reciprocal of the tip distance by a predetermined value. By making the size of the cropped image inversely proportional to a distance from the camera, it is possible to maintain high recognition accuracy of the fingertip shape even when the apparent size changes depending on the distance of the hand or finger from the camera. Note that instead of making the size of the cropped image inversely proportional to the distance, accuracy of fingertip shape recognition can be improved by approximation using a straight line.

As described above, the controller 51 (or the image processor 60) can determine the distance to the hand or finger, adjust the size of the image to be input to the learning model (the shape recognition unit 63) based on the determined distance, and input the adjusted image to the learning model. In this way, it is possible to improve accuracy of fingertip shape recognition.

The offset calculator 612 acquires the cropped image size from the size calculator 610, and calculates an offset vector by multiplying the cropped image size by a predetermined coefficient based on information about the direction of the search axis used by the target tip detector 611. Subsequent processing is similar to that of Embodiment 2, and therefore a description thereof will be omitted.

The fingertip position calculator 615 may calculate the fingertip position by subtracting an offset vector from the midpoint calculated by the region midpoint calculator 614 and then adding an adjustment vector obtained by multiplied by the cropped image size by a predetermined coefficient to the search axis direction.

Embodiment 5

The fingertip position may vary from frame to frame of the hand or finger image (camera image) due to recognition errors, and the pointer displayed on the display screen may tremble (slightly fluctuate). As a countermeasure, it is possible to calculate a moving average of the pointer position and correct the pointer position. However, since a fingertip position in a past frame is reflected in a process of calculating the moving average, display of the pointer may lag behind the actual movement of the finger, which may cause an uncomfortable feeling for the user. The uncomfortable feeling becomes more noticeable as the fingertip moves faster. In Embodiment 5, a description will be given of a method of eliminating a factor causing an uncomfortable feeling due to minute fluctuation in the pointer.

Figure 20:
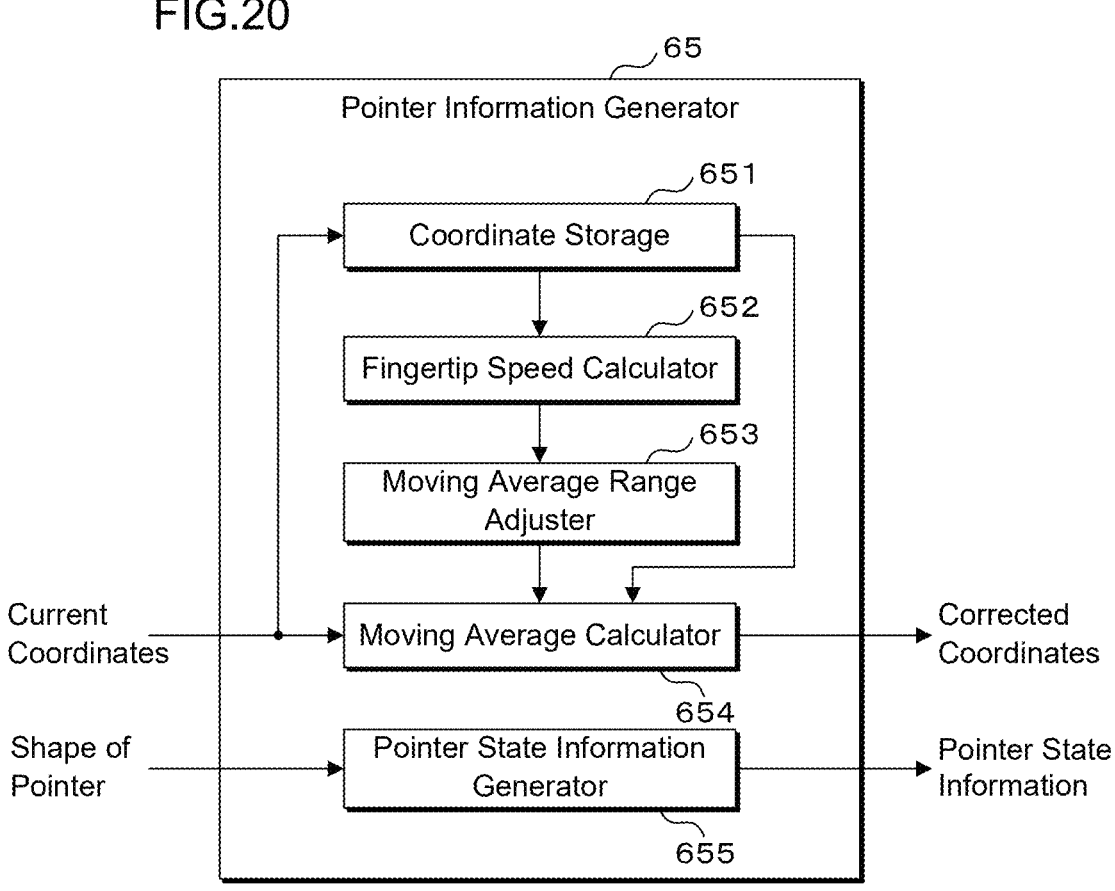
FIG. 20 is a diagram illustrating an example of a configuration of a pointer information generator of Embodiment 5.

FIG. 20 is a diagram illustrating an example of a configuration of a pointer information generator 65 of Embodiment 5. The pointer information generator 65 includes a coordinate storage 651, a fingertip speed calculator 652, a moving average range adjuster 653, a moving average calculator 654, and a pointer state information generator 655. To smooth movement of the pointer, the pointer information generator 65 calculates the moving average of the pointer position using a history of past pointer coordinates to correct the position (coordinates) of the pointer. In addition, when calculating the moving average, the pointer information generator 65 adjusts the range of the moving average according to the moving speed of the fingertip, thereby suppressing minute fluctuation in the pointer position and reducing delay in the movement of the pointer. A detailed description will be given below.

The position of the fingertip and the shape of the pointer (class corresponding to the pointer) output from the pointer selector 64 are input to the pointer information generator 65.

The coordinate storage 651 sequentially stores the position of the fingertip output from the pointer selector 64 as a history of the pointer coordinates.

The fingertip speed calculator 652 calculates the fingertip speed for each frame based on change in the fingertip position between different frames on the basis of the fingertip position for each frame stored in the coordinate storage 651.

The moving average range adjuster 653 holds the range of the moving average and adjusts the range based on the input fingertip speed. The range is the number of frames when calculating the moving average. For example, referring to range adjustment, when the fingertip speed is greater than a predetermined threshold, 1 is subtracted from the number of ranges used in a previous frame to obtain a new number of ranges, and when the fingertip speed is less than the predetermined threshold, 1 is added to the number of ranges used in the previous frame to obtain a new number of ranges. In addition, an upper limit and a lower limit may be provided for the range when calculating the moving average. Note that, even though the range to be adjusted is ±1, when the change in fingertip speed is large, the range to be adjusted does not need to be limited to ±1, and may be set to, for example, ±2.

Upon receiving input of the position (current coordinates) of the pointer (fingertip) from the pointer selector 64, the moving average calculator 654 acquires an adjusted range from the moving average range adjuster 653, reads the history of the pointer coordinates stored in the coordinate storage 651, calculates the moving average, and outputs corrected coordinates of the pointer (fingertip).

The pointer state information generator 655 generates information (pointer state information) indicating whether the pointer is in a selected state or a non-selected state based on the type of pointer output from the pointer selector 64 (whether the classified class is class 0 or class 1), and outputs the information to the pointer information transmitter 66.

Figure 21:
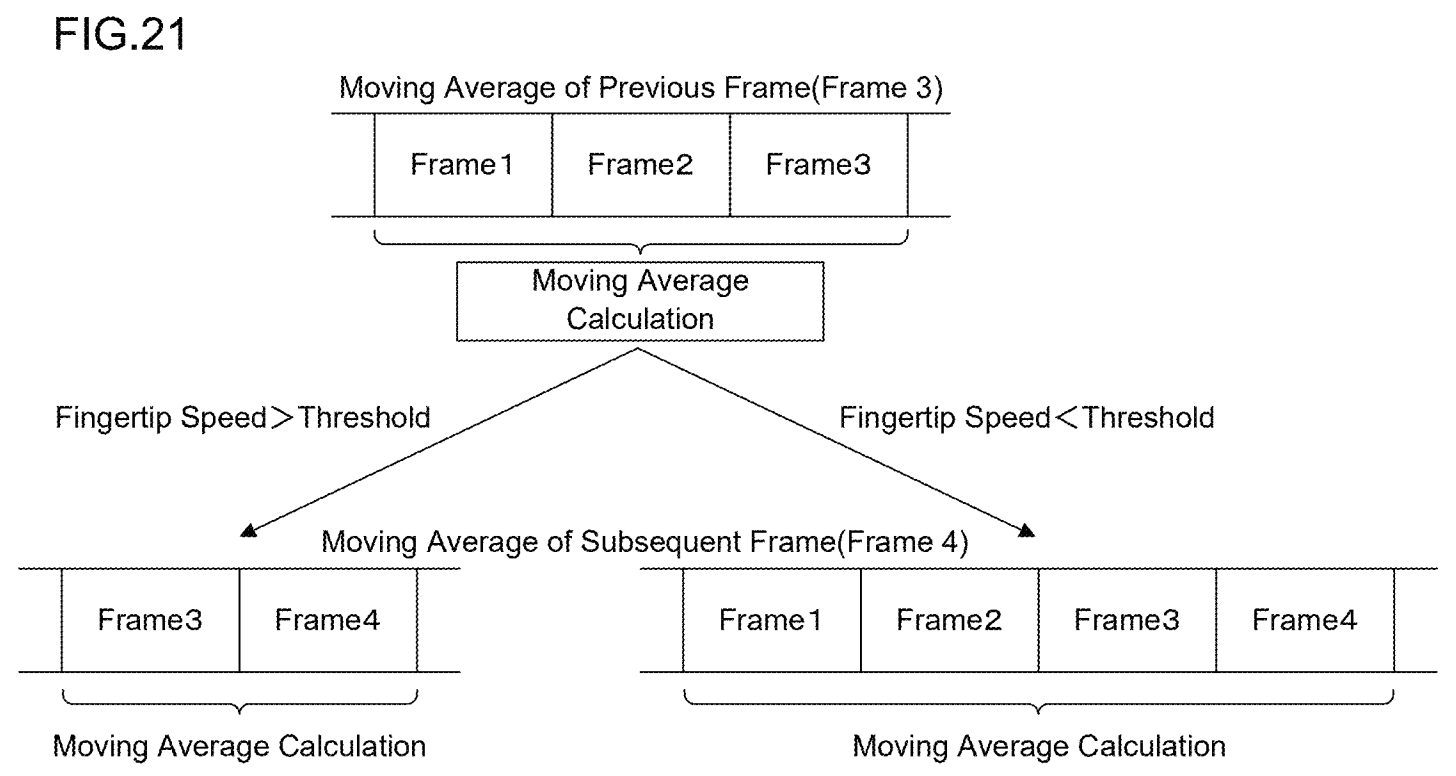

FIG. 21 is a diagram illustrating an example of range adjustment of the moving average. A range of moving average calculation in a previous frame (frame 3) is set to 3, and it is presumed that a moving average of the fingertip position is calculated based on a position of the fingertip for each of three frames of frame 3, 2, and 1 going back from frame 3. When the fingertip speed in a subsequent frame (frame 4) is greater than a threshold, 1 is subtracted from the range using the previous frame. Thus, the number of ranges becomes 2 (=3−1), and the moving average of the fingertip position is calculated based on the position of the fingertip in each of frames 4 and 3. In addition, when the fingertip speed in the subsequent frame is less than the threshold, 1 is added to the range using the previous frame. Thus, the number of ranges becomes 4 (=3+1), and the moving average of the fingertip position is calculated based on the position of the fingertip in each of frames 4, 3, 2, and 1.

As described above, the controller 51 (or image processor 60) may store a history of a set pointer position in association with a frame, adjust the number of frames for calculating the moving average according to the moving speed of the fingertip (end of the indicator), calculate the moving average of the pointer position in each of the adjusted number of frames, and set the pointer position based on the calculated moving average. In this way, it is possible to eliminate a factor causing an uncomfortable feeling due to minute fluctuation in the pointer position or delay in movement of the pointer.

Figure 22:
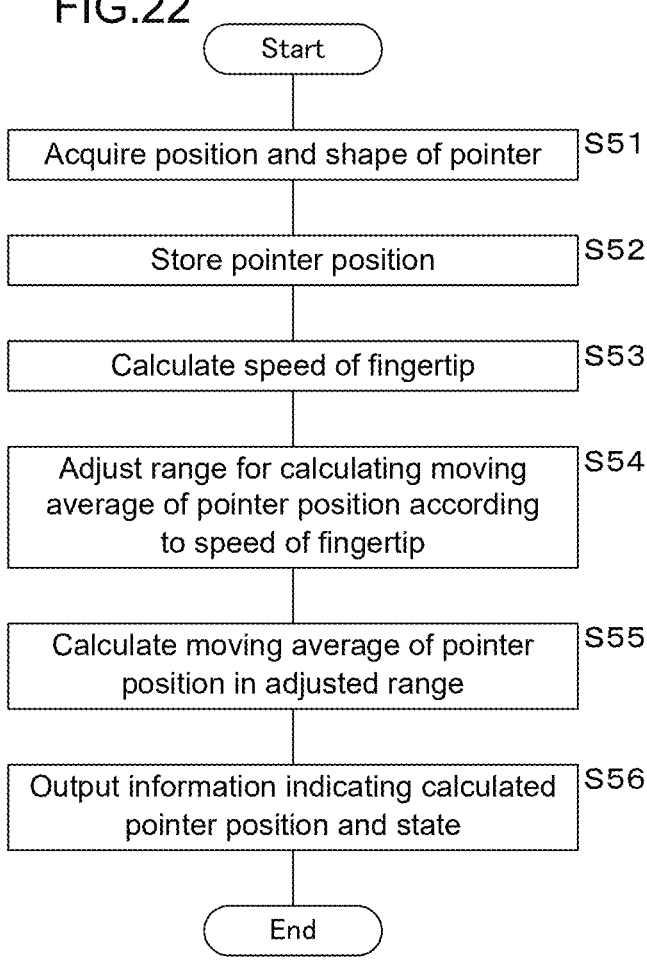
FIG. 22 is a diagram illustrating an example of a processing procedure of an image process of Embodiment 5.

FIG. 22 is a diagram illustrating an example of a processing procedure of an image processor 60 of Embodiment 5. In the following, for convenience, the subject of the processing is described as the image processor 60. The image processor 60 acquires the position and shape of the pointer (S51) and stores the pointer position as history information (S52). The image processor 60 calculates the speed of the fingertip (pointer) (S53) and adjusts the range for calculating the moving average of the pointer position (fingertip position) according to the speed of the fingertip (S54).

The image processor 60 calculates the moving average of the pointer position in the adjusted range (S55). The image processor 60 outputs information indicating the calculated pointer position and state (S56), and ends processing.

As mentioned above, since the range for calculating the moving average of the fingertip position is adjusted according to the fingertip speed, it is possible to eliminate a factor of pointer display being delayed from actual finger movement, which makes the user feel uncomfortable. In addition, since the range is adjusted by ±1 for each frame, it is possible to inhibit discontinuous change of the pointer position.

Embodiment 6

When the direction of the search axis used to detect the fingertip position is misaligned with a direction in which the fingertip is pointing, the detected fingertip position is unlikely to match the subjective opinion of the user. In Embodiment 6, a description will be given of a method of correcting the direction of the search axis to the direction in which the fingertip is pointing.

Figure 23:
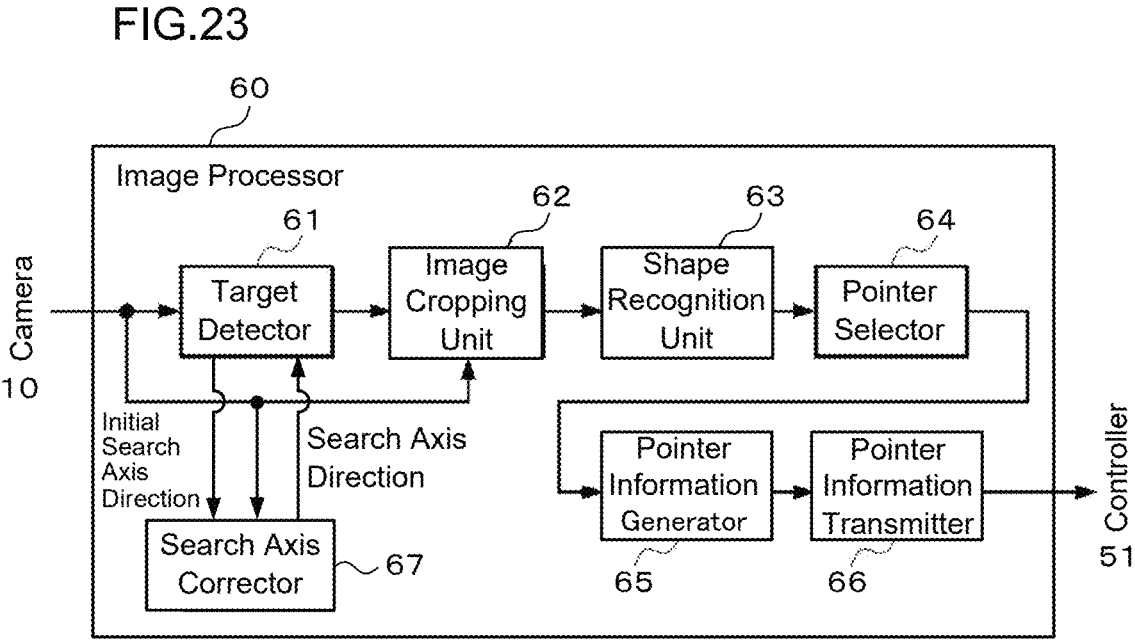
FIG. 23 is a diagram illustrating an example of a configuration of an image processor of Embodiment 6.

FIG. 23 is a diagram illustrating an example of a configuration of an image processor 60 of Embodiment 6. A difference from the above-described embodiments is that a search axis corrector 67 is included. The search axis corrector 67 acquires an initial search axis direction (information on the search axis direction before correction) from the target detector 61, and outputs a search axis direction (information on the search axis direction after correction) to the target detector 61.

Figure 24:
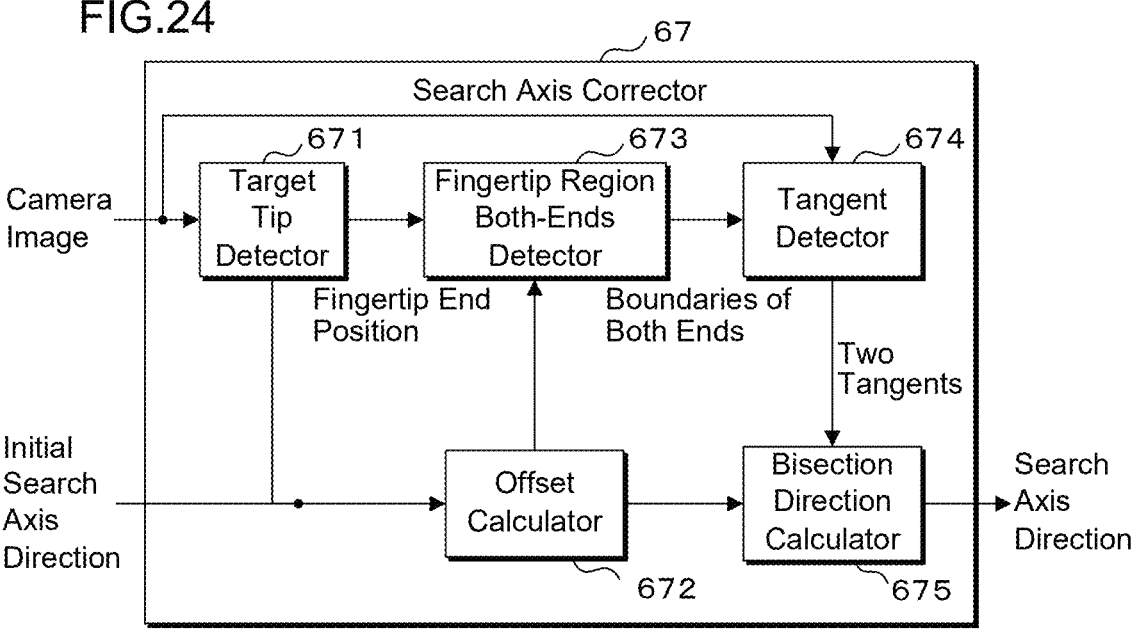
FIG. 24 is a diagram illustrating an example of a configuration of a search axis corrector.
Figure 25:
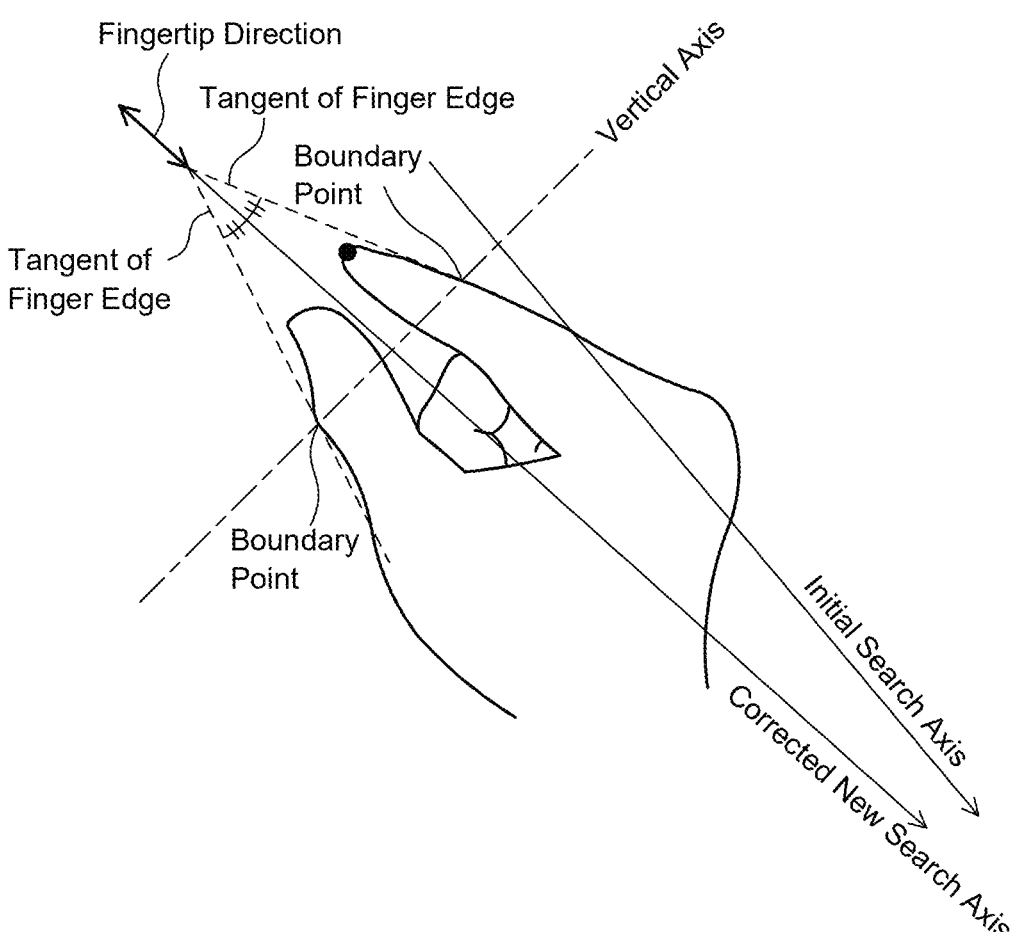
FIG. 25 is a diagram illustrating a method of correcting a search axis.

FIG. 24 is a diagram illustrating an example of a configuration of the search axis corrector 67, and FIG. 25 is a diagram illustrating a method of correcting the search axis. As illustrated in FIG. 24, the search axis corrector 67 includes a target tip detector 671, an offset calculator 672, a fingertip region both-ends detector 673, a tangent detector 674, and a bisection direction calculator 675. The target tip detector 671, the offset calculator 672, and the fingertip region both-ends detector 673 are similar to the target tip detector 611, the offset calculator 612, and the fingertip region both-ends detector 613 of the target detector 61 of Embodiment 2.

The target tip detector 671 searches the image of the hand or finger acquired from the camera 10 in a direction of an initial search axis, detects, as a fingertip end, a fingertip corresponding to an uppermost stream side of the initial search axis when a plurality of fingertips is present in the image, and outputs a detected fingertip end position (coordinates on the image) to the fingertip region both-ends detector 673.

The offset calculator 672 calculates an offset vector by multiplying a unit vector in the initial search axis direction by a predetermined coefficient based on information on the initial search axis direction used by the target tip detector 671.

The fingertip region both-ends detector 673 sets a vertical axis that passes through an end position obtained by adding an offset vector to a fingertip end position as a start point and is perpendicular to the initial search axis (vertical direction), and detects boundaries of both ends of the thumb and the index finger (boundary points of FIG. 25) on the set vertical axis.

The tangent detector 674 traces an edge of a finger near each of the boundaries of both ends (boundary points), and detects a tangent of the edge at the boundary point. In FIG. 25, a tangent of a finger edge passing through a boundary point of the thumb (an edge of a finger on the opposite side from the index finger) and a tangent of a finger edge passing through a boundary point of the index finger (an edge of a finger on the opposite side from the thumb) are detected.

The bisection direction calculator 675 derives a straight line that bisects an angle between the two detected tangents, and calculates a unit vector of the derived straight line in a direction opposite to the fingertip direction as a corrected search axis direction. The bisection direction calculator 675 outputs information about the corrected search axis direction to the target detector 61.

When the initial search axis direction and the fingertip direction are significantly different, misalignment between the search axis direction and the fingertip direction may remain even when the above procedure is performed only once. Even in this case, the search axis direction can be brought closer to the fingertip direction by repeating the above processes using the corrected search axis direction as the initial search axis direction and sequentially updating the search axis.

As described above, the controller 51 (or the image processor 60) may search the acquired image of the hand or finger along a search axis in a predetermined direction to detect a tip of a fingertip, set a perpendicular axis (vertical axis) separated from the detected tip by a predetermined distance and perpendicular to the search axis, perform a search along the set perpendicular axis to detect a first outer boundary point and a second outer boundary point of ta first finger (for example, the thumb) and a second finger (for example, the index finger), respectively, and correct the search axis direction based on a first tangent line (for example, a tangent line of the thumb edge) in contact with a boundary of the first finger at the detected first outer boundary point and a second tangent line (for example, a tangent line of the index finger edge) in contact with a boundary of the second finger at the detected second outer boundary point. In this way, it is possible to inhibit the detected fingertip position from deviating from the subjective opinion of the user.

According to Embodiment 6, the search axis direction can be brought closer to the direction in which the fingertip is pointing before detection of the fingertip position, and deviation from the subjective opinion of the user can be suppressed.

Embodiment 7

In Embodiment 6, the search axis direction is corrected based on the fingertip direction, but the search axis can be set using another method. For example, when a frame rate of the camera 10 is high, image change between adjacent frames is small, and it is expected that the fingertip direction will hardly change. In Embodiment 7, a description will be given of a method of setting the search axis using information on the previous frame.

Figure 26:
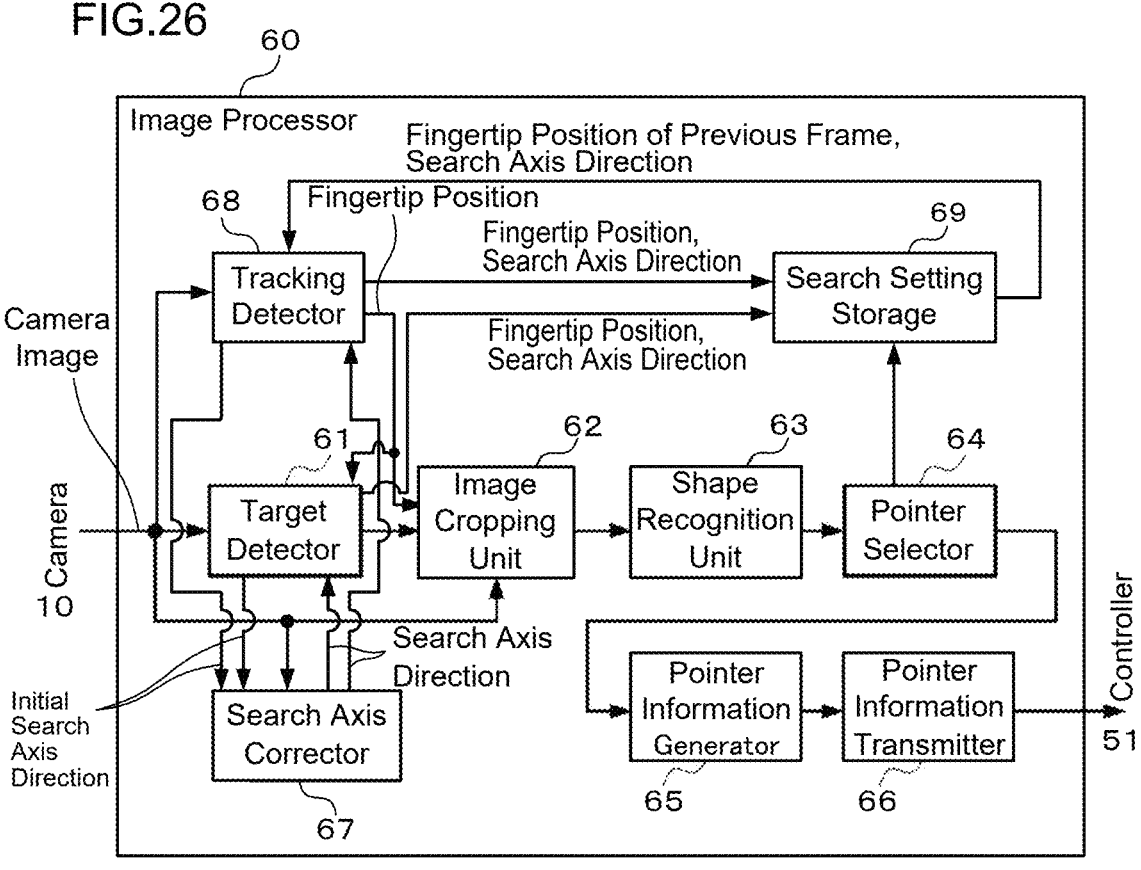
FIG. 26 is a diagram illustrating an example of a configuration of an image processor of Embodiment 7.

FIG. 26 is a diagram illustrating an example of a configuration of an image processor 60 of Embodiment 7. A difference from the image processor 60 of Embodiment 6 illustrated in FIG. 23 is that a tracking detector 68 and a search setting storage 69 are included.

The search setting storage 69 records the fingertip position of each fingertip detected in the previous frame and the search axis direction (information on the search axis direction) used in the previous frame. However, when a class not corresponding to a pointer is acquired from the pointer selector 64, the search setting storage 69 deletes records of the fingertip position of the corresponding fingertip and the search axis direction. The search setting storage 69 outputs the recorded fingertip position for each fingertip detected in the previous frame and the search axis direction used in the previous frame to the tracking detector 68 in a subsequent frame. Note that, when the fingertip position and the search axis direction for each fingertip have not been recorded, the tracking detector 68 takes no action. In other words, the tracking detector 68 takes action when information of the previous frame (fingertip position and search axis direction) is present, and does not take any action when the information is not present.

Figure 27:
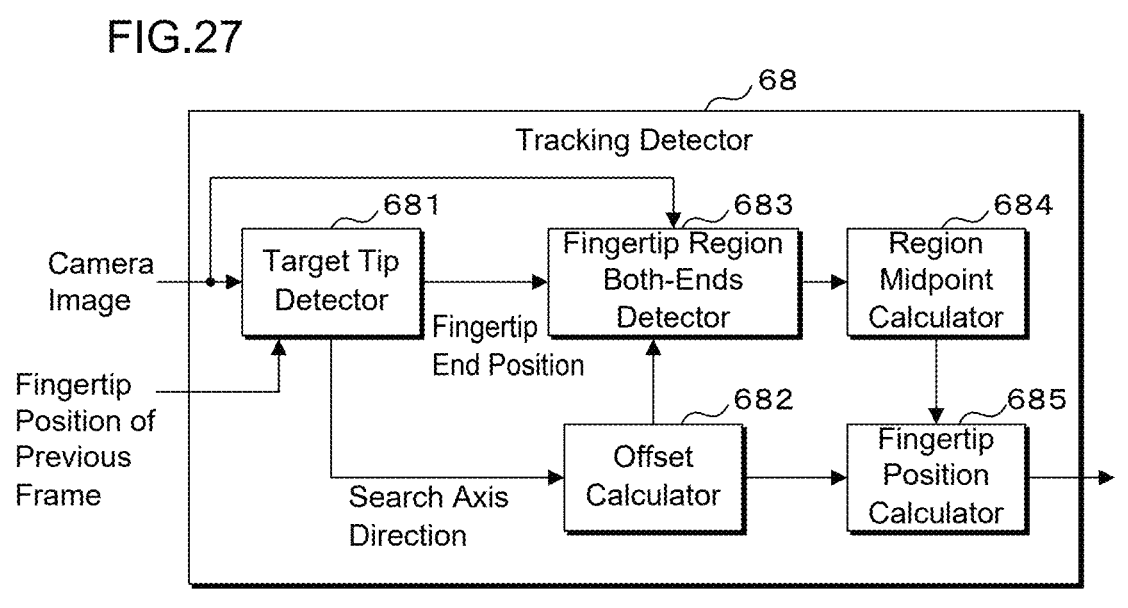

FIG. 27 is a diagram illustrating an example of a configuration of the tracking detector 68. The tracking detector 68 includes a target tip detector 681, an offset calculator 682, a fingertip region both-ends detector 683, a region midpoint calculator 684, and a fingertip position calculator 685. The target tip detector 681, the offset calculator 682, the fingertip region both-ends detector 683, the region midpoint calculator 684, and the fingertip position calculator 685 are similar to the target tip detector 611, the offset calculator 612, the fingertip region both-ends detector 613, the region midpoint calculator 614, and the fingertip position calculator 615 of the target detector 61.

The tracking detector 68 detects a fingertip position in a current frame by referring to the fingertip position detected in the previous frame and the search axis direction used in the previous frame. Specifically, when searching for the tip of the fingertip in the direction of the fingertip recognized in the previous frame, a search range is limited to the vicinity of the fingertip position detected in the previous frame. At the time of a search, the search axis direction used in the previous frame can be used. A reason for limiting the search range to the vicinity of the fingertip position is that the position and direction of the fingertip are considered to be largely unchanged between adjacent frames.

When the information of the previous frame (fingertip position and search axis direction) is not recorded in the search setting storage 69, the target detector 61 detects the fingertip position instead of the tracking detector 68.

As described above, the controller 51 (or the image processor 60) may store the fingertip position and the search axis direction specified when the pointer position is set in association with the frame, and set the position of the pointer by performing a search along the search axis based on the position of the fingertip to detect the tip of the fingertip when a fingertip position and a search axis direction associated with a most recent frame are stored.

According to Embodiment 7, regardless of whether a hand is the right hand or the left hand, only one search axis is required, there is no need to perform a search using two search axes unlike the embodiments described above, and it is possible to reduce processing time and processing effort required for the search.

Note that, to detect a fingertip that newly appears in a field of view of the camera, a search using two or more search axes needs to be performed. In this case, a search using information of the previous frame can be performed first, and then a search using two or more search axes can be performed. In a search using two or more search axes, to avoid duplicate detection of the fingertip position detected in a search using the information of the previous frame, a neighboring region thereof may be excluded from the search target.

Embodiment 8

Figure 28:
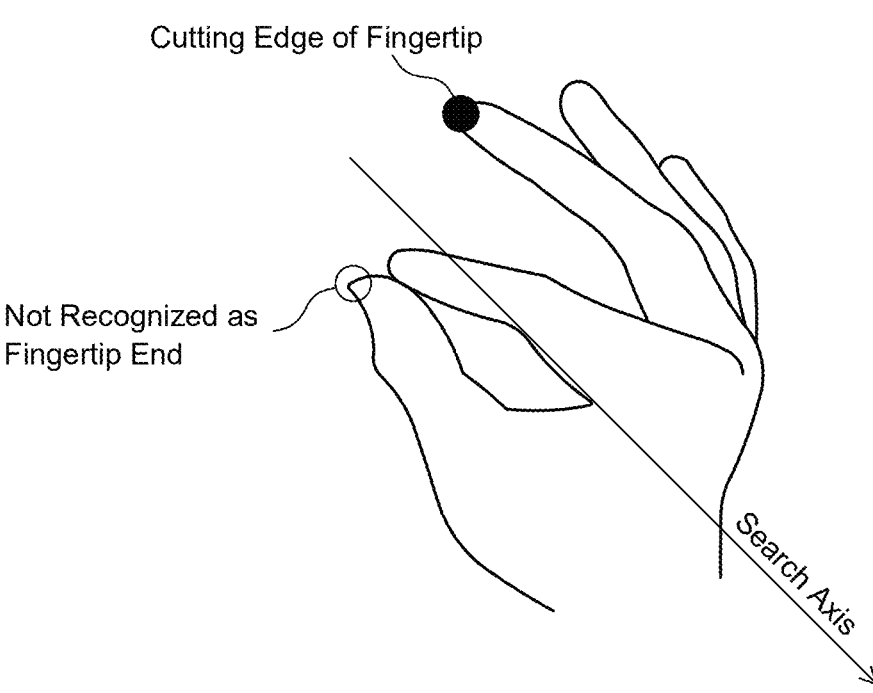
FIG. 28 is a diagram illustrating an example of missed detection of a fingertip end.

FIG. 28 is a diagram illustrating an example of missed detection of a fingertip end. The target tip detector 611 of the embodiments described above searches the image of the hand or finger acquired from the camera 10 in the search axis direction, detects, as a fingertip end, a fingertip corresponding to an uppermost stream side of the search axis when a plurality of fingertips is present in the image, and outputs a detected fingertip end position to the fingertip region both-ends detector 613. However, as illustrated in FIG. 28, a plurality of fingertips is captured in the image of the hand or finger in some cases, and depending on the states of the plurality of fingertips (such as the action or posture of the hand or finger by the user), it is possible to detect the most upstream point in the search axis direction. However, there is a possibility that a necessary part such as a pinched shape may be overlooked. In Embodiment 8, a description will be given of a method of detecting a plurality of fingertip ends.

Figure 29:
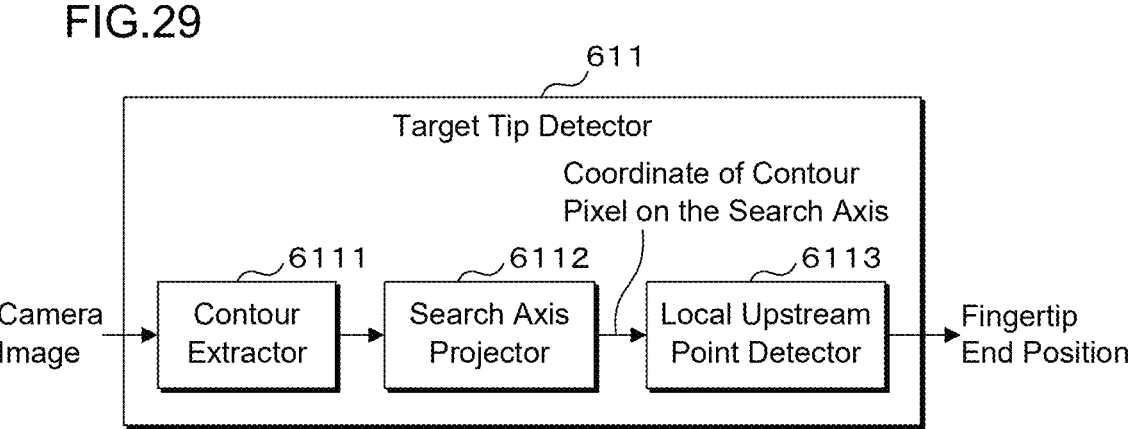
FIG. 29 is a diagram illustrating an example of a configuration of a target tip detector of Embodiment 8.
Figure 30:
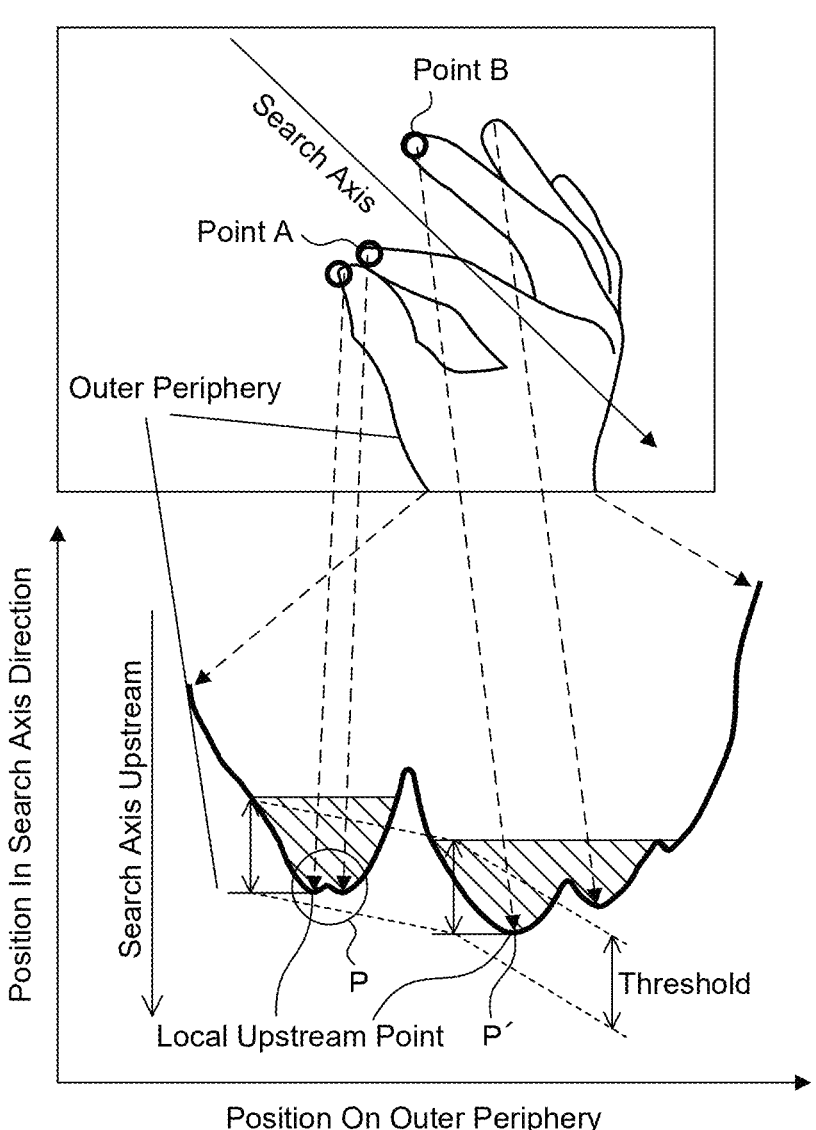
FIG. 30 is a diagram illustrating a method of detecting a fingertip end.

FIG. 29 is a diagram illustrating an example of a configuration of a target tip detector 611 of Embodiment 8, and FIG. 30 is a diagram illustrating a method of detecting a fingertip end. As illustrated in FIG. 29, the target tip detector 611 includes a contour extractor 6111, a search axis projector 6112, and a local upstream point detector 6113.

The contour extractor 6111 extracts a contour of a target object (the hand or finger) present in a camera image (an image of the hand or finger) and generates a coordinate list of each pixel of the extracted contour (a pixel on the outer periphery of the hand or finger). The contour extractor 6111 outputs the generated coordinate list to the search axis projector 6112.

The search axis projector 6112 projects each pixel in the acquired coordinate list onto the search axis to convert each pixel into coordinates on the search axis. Projection onto the search axis is performed in a direction perpendicular to the search axis. By projecting coordinates on the contour (on the outer periphery) onto the search axis, a position on the outer periphery of the hand or finger and a position in the search axis direction are associated with each other by a function, as illustrated in FIG. 30. In FIG. 30, a graph representing a function is drawn in a two-dimensional coordinate system in which a horizontal axis indicates the position on the outer periphery and a vertical axis indicates the position in the search axis direction.

The local upstream point detector 6113 searches for the position on the outer periphery to obtain the position in the search axis direction, and detects a valley where a difference greater than or equal to a preset threshold is present as a position of the fingertip end. As illustrated in FIG. 30, in the graph representing the function, the valley corresponds to an upstream point indicating the fingertip. By setting an appropriate threshold, all valleys each having a peak greater than or equal to the preset threshold on both sides of the valley are detected as local upstream points.

As illustrated in FIG. 30, a valley P corresponding to the tip of the thumb is detected as a local upstream point since a peak greater than or equal to the threshold is present on both sides thereof. In addition, the tip of the index finger (point A) is integrated with the valley of the thumb, and thus is excluded from the local upstream point. Here, the tip of the index finger is excluded rather than the tip of the thumb since the tip of the thumb is located further upstream in the search axis direction. A valley P' corresponding to the tip of the middle finger (point B) is detected as a local upstream point since a peak greater than or equal to the threshold is present on both sides thereof. In addition, a valley corresponding to the tip of the ring finger is excluded from the local upstream point since there is no peak greater than or equal to the threshold on both sides thereof.

As described above, the controller 51 (or image processor 60) may specify a contour of the hand or finger based on the acquired image of the hand or finger, associate each point on the specified contour with a distance from a search axis in a predetermined direction, and specify a point on the contour corresponding to a minimum point (locally upstream point) of the associated distance as a fingertip end.

According to Embodiment 8, even when a necessary part such as a pinched shape is not at the most upstream in the search axis direction, the necessary part can be reliably detected as a fingertip. Furthermore, it is possible to suppress detection of a part integrated with another fingertip such as point A, or a minute protrusion that is accidentally generated due to noise.

The non-contact user interface described in each of the above embodiments can be used as a non-contact user interface in various fields. Examples of such fields include applications and operation devices used in information processing devices, in-vehicle devices, medical devices, etc. The following describes a case where the non-contact user interface is used in an in-vehicle device.

Figure 31:
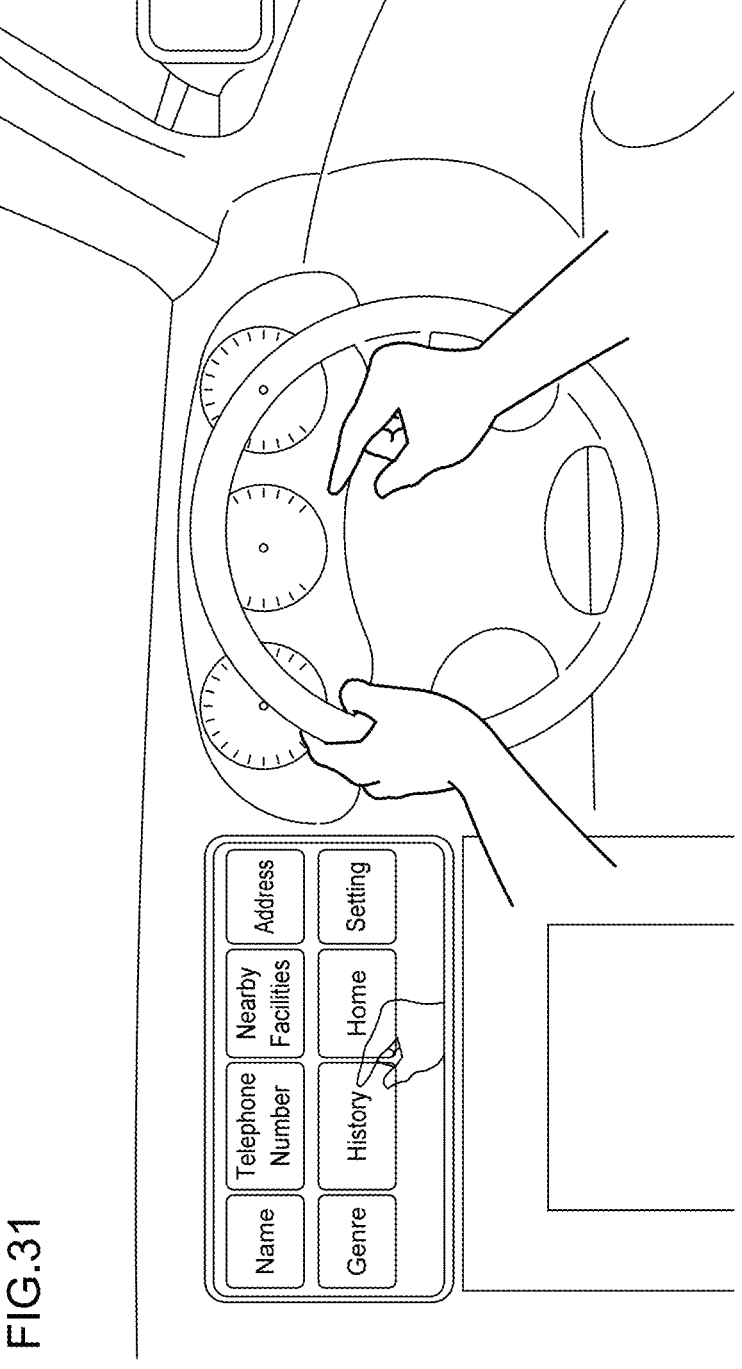
FIG. 31 is a diagram illustrating an example of an in-vehicle interface device.

FIG. 31 is a diagram illustrating an example of an in-vehicle interface device. The in-vehicle interface device has a non-contact user interface function for operating a navigation screen in a non-contact manner. The in-vehicle interface device may include the image processing device 50 and the camera 10 described above.

As illustrated in FIG. 31, when the user (driver) moves the thumb and the index finger between a steering wheel and the driver, an image of the hand or finger captured by the camera 10 (not illustrated) is transmitted to the image processing device 50. The camera 10 may be installed at an appropriate location in the vehicle. The image processing device 50 superimposes the image of the hand or finger on the navigation screen. In this case, the image of the hand or finger may be made semi-transparent, for example, to maintain visibility of symbols such as letters on the navigation screen. For example, the user may move the thumb and the index finger while separating the thumb and the index finger from each other, thereby moving the image of the hand or finger on the navigation screen onto a "history" icon. The user may then pinch the thumb and the index finger to operate the "history" icon. This description is similarly applied to other icons on the navigation screen.

The image of the hand or finger may be the image captured by the camera 10 itself, or an image obtained by processing the image of the hand or finger may be displayed. The processed image may include, for example, a representative image of the hand or finger (which may be a real image or a drawing) and a symbol representing a pointer prepared in advance. Further, instead of displaying the image of the hand or finger semi-transparently in a superimposed manner, the image may be displayed small as a wipe image on a part of the navigation screen.

The controller 51 (or the image processor 60) may combine the acquired image (the image of the hand or finger) or the image obtained by processing the acquired image with the symbol representing the pointer and display the image on the display screen.

The controller 51 (or the image processor 60) may display an image of the hand or finger in a state in which a first finger and a second finger separated from each other on a display screen, display a pointer between a fingertip of the first finger and a fingertip of the second finger, and execute an operation on the display screen indicated by the pointer when receiving an action of putting the fingertip of the first finger and the fingertip of the second finger into contact. The image of the hand or finger may be displayed semi-transparently on the display screen, thereby improving visibility of the various operation icons on the display screen.

As described above, the in-vehicle interface device includes a controller, and the controller acquires an image of the hand or finger, sets a pointer designating a position represented by the fingertip of the first finger and the fingertip of the second finger at a position between the fingertip of the first finger and the fingertip of the second finger specified based on the acquired image, and accepts an operation by the pointer displayed on an in-vehicle device operation screen.

Note that, for example, when a voice message such as "You can select history by pinching action" is output in response to the image of the hand or finger moving onto the "history" icon, the user can operate a navigation system without taking eyes off the front of the vehicle, which contributes to safe driving. In the example of FIG. 31, the navigation screen is used as an example, but the in-vehicle device is not limited to a navigation device and may be another in-vehicle device such as an AV device.

In the above embodiments, the hand or finger has been described as an example of the indicator, but the indicator is not limited to the hand or finger. For example, the indicator may be a surgical tool such as forceps, or a robot hand that imitates the hand or finger. In addition, similar effects can be obtained even when the hand or finger is not a bare hand or finger, such as when the hand or finger is gloved.

(Additional Note 1) A computer program causes a computer to execute processes of acquiring an image in which a plurality of indicators is captured, and setting a pointer designating a position represented by ends of a first indicator and a second indicator at a position between the end of the first indicator and the end of the second indicator specified based on the acquired image.

(Additional Note 2) A computer program is the computer program according to additional note 1, wherein the image in which the plurality of indicators is captured is an image of a hand or finger, the end of the first indicator and the end of the second indicator are a fingertip of a first finger and a fingertip of a second finger, and the computer program causes the computer to execute a process of setting the pointer at a middle position between the fingertip of the first finger and the fingertip of the second finger.

(Additional Note 3) A computer program is the computer program according to additional note 2, wherein one of the first finger and the second finger is a thumb, and the computer program causes the computer to execute a process of setting the pointer at a pad of the thumb.

(Additional Note 4) A computer program is the computer program according to additional note 2 or 3, wherein the computer program causes the computer to execute processes of detecting a tip of a fingertip by performing a search along a search axis in a predetermined direction on the acquired image of the hand or finger, setting a perpendicular axis separated from the tip by a predetermined distance and perpendicular to the search axis, detecting an outer boundary of each of the first finger and the second finger by performing a search along the set perpendicular axis, specifying a midpoint of the detected outer boundary, and setting the pointer based on the specified midpoint.

(Additional Note 5) A computer program is the computer program according to additional note 4, wherein the computer program causes the computer to execute a process of setting the pointer at a position offset from the midpoint by a predetermined distance in a direction parallel to the search axis.

(Additional Note 6) A computer program is the computer program according to any one of additional notes 1 to 5, wherein the computer program causes the computer to execute a process of accepting an operation of setting a movement amount for moving the position of the set pointer to a desired position.

(Additional Note 7) A computer program is the computer program according to any one of additional notes 1 to 6, wherein the computer program causes the computer to execute processes of displaying a plurality of positions of the pointer as selectable candidate positions, and accepting an operation of selecting a position of the pointer from among the displayed candidate positions.

(Additional Note 8) A computer program is the computer program according to any one of additional notes 2 to 5, wherein the computer program causes the computer to execute processes of inputting the image of the hand or finger to a learning model generated to output classification information including a first shape in which the first finger and the second finger are in contact or a second shape in which the first finger and the second finger are separated from each other when the image of the hand or finger is input, and switching a display mode of a pointer located between a tip of the first finger and a tip of the second finger depending on the classification information output by the learning model.

(Additional Note 9) A computer program is the computer program according to additional note 8, wherein the computer program causes the computer to execute processes of specifying a distance to the hand or finger, adjusting a size of an image input to the learning model based on the specified distance, and inputting an image after adjustment to the learning model.

(Additional Note 10) A computer program is the computer program according to any one of additional notes 1 to 9, wherein the computer program causes the computer to execute a process of composing an acquired image or an image obtained by processing the image with a symbol representing the pointer and displaying the image on a display screen.

(Additional Note 11) A computer program is the computer program according to any one of additional notes 2 to 10, wherein the computer program causes the computer to execute processes of displaying an image of the hand or finger in a state in which the first finger and the second finger are separated from each other on a display screen, displaying a pointer between the fingertip of the first finger and the fingertip of the second finger, and executing an operation on the display screen indicated by the pointer when accepting an action of putting the fingertip of the first finger and the fingertip of the second finger into contact.

(Additional Note 12) A computer program is the computer program according to any one of additional notes 1 to 11, wherein the computer program causes the computer to execute processes of storing a history of the position of the set pointer in association with a frame, adjusting a number of frames for calculating a moving average according to a moving speed of an end of the indicator, calculating a moving average of the position of the pointer in each of the adjusted number of frames, and setting the position of the pointer based on the calculated moving average.

(Additional Note 13) A computer program is the computer program according to any one of additional notes 2 to 5, wherein the computer program causes the computer to execute processes of detecting a tip of a fingertip by performing a search along a search axis in a predetermined direction on the acquired image of the hand or finger, setting a perpendicular axis separated from the tip by a predetermined distance and perpendicular to the search axis, detecting a first outer boundary point and a second outer boundary point of the first finger and the second finger, respectively, by performing a search along the set perpendicular axis, and correcting the direction of the search axis based on a first tangent line tangent to a boundary of the first finger at the detected first outer boundary point and a second tangent line tangent to a boundary of the second finger at the detected second outer boundary point.

(Additional Note 14) A computer program is the computer program according to any one of additional notes 2 to 5, wherein the computer program causes the computer to execute processes of storing a position of a fingertip specified when the position of the pointer is set and a direction of a search axis in association with a frame, and setting the position of the pointer by detecting a tip of a fingertip by performing a search along a search axis associated with a most recent frame based on a position of the fingertip associated with the most recent frame when the position of the fingertip and a direction of the search axis associated with the most recent frame are stored.

(Additional Note 15) A computer program is the computer program according to any one of additional notes 2 to 5, wherein the computer program causes the computer to execute processes of specifying a contour of the hand or finger based on the acquired image of the hand or finger, associating each point on the specified contour with a distance to a search axis in a predetermined direction, and specifying a point on the contour corresponding to a minimum point of the distance as a fingertip end.

(Additional Note 16) An image processing device includes a controller, wherein the controller is configured to acquire an image in which a plurality of indicators is captured, and set a pointer designating a position represented by ends of a first indicator and a second indicator at a position between the end of the first indicator and the end of the second indicator specified based on the acquired image.

(Additional Note 17) An image processing device is the image processing device according to additional note 16, wherein the controller acquires an image in which the plurality of indicators is captured by a TOF (Time Of Flight) camera.

(Additional Note 18) An image processing method includes acquiring an image in which a plurality of indicators is captured, and setting a pointer designating a position represented by ends of a first indicator and a second indicator at a position between the end of the first indicator and the end of the second indicator specified based on the acquired image.

(Additional Note 19) An in-vehicle interface device includes a controller, wherein the controller is configured to acquire an image in which a plurality of indicators is captured, set a pointer designating a position represented by ends of a first indicator and a second indicator at a position between the end of the first indicator and the end of the second indicator specified based on the acquired image, and accept an operation by the pointer displayed on an in-vehicle device operation screen.

The matters described in each embodiment can be combined with each other. In addition, independent claims and dependent claims described in the claims can be combined with each other in any combination regardless of the citation format. Furthermore, the claims use a format in which a claim cites two or more other claims (multi-claim format), but the claims are not limited thereto. A format in which a multi-claim cites at least one multi-claim (multi-multi-claim) may be used.

It is to be noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A computer readable non-transitory recording medium recording a computer program causing a computer to execute processes of:
   acquiring an image in which a plurality of indicators is captured;
   setting a pointer designating a position represented by ends of a first indicator and a second indicator at a position between the end of the first indicator and the end of the second indicator specified based on the acquired image;
   storing a history of the position of the set pointer in association with a frame;
   adjusting a number of frames for calculating a moving average according to a moving speed of an end of the indicator;
   calculating a moving average of the position of the pointer in each of the adjusted number of frames upon receipt of a current frame; and
   setting the position of the pointer in the current frame based on the calculated moving average.

2. The computer readable non-transitory recording medium recording the computer program according to claim 1, wherein:
   the image in which the plurality of indicators is captured is an image of a hand or finger,
   the end of the first indicator and the end of the second indicator are a fingertip of a first finger and a fingertip of a second finger, and
   the computer program causes the computer to execute a process of setting the pointer at a middle position between the fingertip of the first finger and the fingertip of the second finger.

3. The computer readable non-transitory recording medium recording the computer program according to claim 2, wherein:
   one of the first finger and the second finger is a thumb, and
   the computer program causes the computer to execute a process of setting the pointer at a pad of the thumb.

4. The computer readable non-transitory recording medium recording the computer program according to claim 2, wherein the computer program causes the computer to execute processes of:

detecting a tip of a fingertip by performing a search along a search axis in a predetermined direction on the acquired image of the hand or finger;

setting a perpendicular axis separated from the tip by a predetermined distance and perpendicular to the search axis;

detecting an outer boundary of each of the first finger and the second finger by performing a search along the set perpendicular axis;

specifying a midpoint of the detected outer boundary; and setting the pointer based on the specified midpoint.

5. The computer readable non-transitory recording medium recording the computer program according to claim 4, wherein the computer program causes the computer to execute a process of setting the pointer at a position offset from the midpoint by a predetermined distance in a direction parallel to the search axis.

6. The computer readable non-transitory recording medium recording the computer program according to claim 1, wherein the computer program causes the computer to execute a process of accepting an operation of setting a movement amount for moving the position of the set pointer to a desired position.

7. The computer readable non-transitory recording medium recording the computer program according to claim 1, wherein the computer program causes the computer to execute processes of:

displaying a plurality of positions of the pointer as selectable candidate positions; and accepting an operation of selecting a position of the pointer from among the displayed candidate positions.

8. The computer readable non-transitory recording medium recording the computer program according to claim 2, wherein the computer program causes the computer to execute processes of:

inputting the image of the hand or finger to a learning model generated to output classification information including a first shape in which the first finger and the second finger are in contact or a second shape in which the first finger and the second finger are separated from each other when the image of the hand or finger is input; and switching a display mode of a pointer located between a tip of the first finger and a tip of the second finger depending on the classification information output by the learning model.

9. The computer readable non-transitory recording medium recording the computer program according to claim 8, wherein the computer program causes the computer to execute processes of:

specifying a distance to the hand or finger;

adjusting a size of an image input to the learning model based on the specified distance; and inputting an image after adjustment to the learning model.

10. The computer readable non-transitory recording medium recording the computer program according to claim 1, wherein the computer program causes the computer to execute a process of composing an acquired image or an image obtained by processing the image with a symbol representing the pointer and displaying the image on a display screen.

11. The computer readable non-transitory recording medium recording the computer program according to claim 2, wherein the computer program causes the computer to execute processes of:

displaying an image of the hand or finger in a state in which the first finger and the second finger are separated from each other on a display screen;

displaying a pointer between the fingertip of the first finger and the fingertip of the second finger; and executing an operation on the display screen indicated by the pointer when accepting an action of putting the fingertip of the first finger and the fingertip of the second finger into contact.

12. An image processing device comprising a controller, wherein the controller is configured to:

acquire an image in which a plurality of indicators is captured;

set a pointer designating a position represented by ends of a first indicator and a second indicator at a position between the end of the first indicator and the end of the second indicator specified based on the acquired image;

store a history of the position of the set pointer in association with a frame;

adjust a number of frames for calculating a moving average according to a moving speed of an end of the indicator;

calculate a moving average of the position of the pointer in each of the adjusted number of frames upon receipt of a current frame; and set the position of the pointer in the current frame based on the calculated moving average.

13. The image processing device according to claim 12, wherein the controller acquires an image in which the plurality of indicators is captured by a TOF (Time Of Flight) camera.

14. An image processing method comprising:

acquiring an image in which a plurality of indicators is captured;

setting a pointer designating a position represented by ends of a first indicator and a second indicator at a position between the end of the first indicator and the end of the second indicator specified based on the acquired image;

storing a history of the position of the set pointer in association with a frame;

adjusting a number of frames for calculating a moving average according to a moving speed of an end of the indicator;

calculating a moving average of the position of the pointer in each of the adjusted number of frames upon receipt of a current frame; and setting the position of the pointer in the current frame based on the calculated moving average.

15. An in-vehicle interface device comprising a controller, wherein the controller is configured to:

acquire an image in which a plurality of indicators is captured;

set a pointer designating a position represented by ends of a first indicator and a second indicator at a position between the end of the first indicator and the end of the second indicator specified based on the acquired image;

store a history of the position of the set pointer in association with a frame;

adjust a number of frames for calculating a moving average according to a moving speed of an end of the indicator;

calculate a moving average of the position of the pointer in each of the adjusted number of frames upon receipt of a current frame;

set the position of the pointer in the current frame based on the calculated moving average; and accept an operation by the pointer displayed on an in-vehicle device operation screen.

16. A computer readable non-transitory recording medium recording a computer program causing a computer to execute processes of:

acquiring an image in which a plurality of indicators is captured;

setting a pointer designating a position represented by ends of a first indicator and a second indicator at a position between the end of the first indicator and the end of the second indicator specified based on the acquired image, wherein:

the image in which the plurality of indicators is cap-tured is an image of a hand or finger, the end of the first indicator and the end of the second indicator are a fingertip of a first finger and a fingertip of a second finger, the computer program causes the computer to execute a process of setting the pointer at a middle position between the fingertip of the first finger and the fingertip of the second finger;

detecting a tip of a fingertip in a current frame by performing a search along a search axis in a predeter-mined direction on the acquired image of the hand or finger;

setting a perpendicular axis separated from the tip by a predetermined distance and perpendicular to the search axis;

detecting an outer boundary of each of the first finger and the second finger by performing a search along the set perpendicular axis;

specifying a midpoint of the detected outer boundary; and setting the position of the pointer in the current frame based on the specified midpoint.

17. A computer readable non-transitory recording medium recording a computer program causing a computer to execute processes of:

acquiring an image in which a plurality of indicators is captured;

setting a pointer in a non-selected state and designating a position represented by ends of a first indicator and a second indicator at a position between the end of the first indicator and the end of the second indicator specified based on the acquired image, wherein:

the image in which the plurality of indicators is cap-tured is an image of a hand or finger, the end of the first indicator and the end of the second indicator are a fingertip of a first finger and a fingertip of a second finger, the computer program causes the computer to execute a process of setting the pointer at a middle position between the fingertip of the first finger and the fingertip of the second finger;

inputting the image of the hand or finger to a learning model generated to output classification information including a first shape indicating a selected state in which the first finger and the second finger are in contact or a second shape indicating a non-selected state in which the first finger and the second finger are separated from each other when the image of the hand or finger is input; and switching a display mode of a pointer located between a tip of the first finger and a tip of the second finger depending on the classification information output by the learning model, wherein the classification indicates a selected state.

18. A computer readable non-transitory recording medium recording a computer program causing a computer to execute processes of:

acquiring an image in which a plurality of indicators is captured;

setting a pointer designating a position represented by ends of a first indicator and a second indicator at a position between the end of the first indicator and the end of the second indicator specified based on the acquired image, wherein:

the image in which the plurality of indicators is captured is an image of a hand or finger, the end of the first indicator and the end of the second indicator are a fingertip of a first finger and a fingertip of a second finger;

detecting a tip of a fingertip by performing a search along a search axis in a predetermined direction on the acquired image of the hand or finger;

setting a perpendicular axis separated from the tip by a predetermined distance and perpendicular to the search axis;

detecting a first outer boundary point and a second outer boundary point of the first finger and the second finger, respectively, by performing a search along the set perpendicular axis;

correcting the direction in a current frame of the search axis based on a first tangent line tangent to a boundary of the first finger at the detected first outer boundary point and a second tangent line tangent to a boundary of the second finger at the detected second outer boundary point; and setting the position of the pointer in the current frame based on the corrected search axis.

19. A computer readable non-transitory recording medium recording a computer program causing a computer to execute processes of:

acquiring an image in which a plurality of indicators is captured;

setting a pointer designating a position represented by ends of a first indicator and a second indicator at a position between the end of the first indicator and the end of the second indicator specified based on the acquired image, wherein:

the image in which the plurality of indicators is captured is an image of a hand or finger, the end of the first indicator and the end of the second indicator are a fingertip of a first finger and a fingertip of a second finger;

storing a position of a fingertip specified when the posi-tion of the pointer is set and a direction of a search axis in association with a frame; and setting the position of the pointer by detecting a tip of a fingertip by performing a search along a search axis associated with a current frame based on a position of the fingertip associated with the current frame when the position of the fingertip and a direction of the search axis associated with the current frame are stored.

20. A computer readable non-transitory recording medium recording a computer program causing a computer to execute processes of:

acquiring an image in which a plurality of indicators is captured;

setting a pointer designating a position represented by ends of a first indicator and a second indicator at a position between the end of the first indicator and the end of the second indicator specified based on the acquired image, wherein:

the image in which the plurality of indicators is captured is an image of a hand or finger, the end of the first indicator and the end of the second indicator are a fingertip of a first finger and a fingertip of a second finger;

specifying a contour of the hand or finger based on the acquired image of the hand or finger;

associating each point on the specified contour with a distance to a search axis in a predetermined direction;

specifying a point on the contour in a current frame corresponding to a local minimum point of the distance as a fingertip end; and setting the position of the pointer in the current frame based on the local minimum point.

21. An image processing device comprising a controller, wherein the controller is configured to:

acquire an image in which a plurality of indicators is captured;

set a pointer designating a position represented by ends of a first indicator and a second indicator at a position between the end of the first indicator and the end of the second indicator specified based on the acquired image, wherein:

the image in which the plurality of indicators is captured is an image of a hand or finger, the end of the first indicator and the end of the second indicator are a fingertip of a first finger and a fingertip of a second finger;

setting the pointer at a middle position between the fingertip of the first finger and the fingertip of the second finger;

detecting a tip of a fingertip in a current frame by performing a search along a search axis in a predetermined direction on the acquired image of the hand or finger;

setting a perpendicular axis separated from the tip by a predetermined distance and perpendicular to the search axis;

detecting an outer boundary of each of the first finger and the second finger by performing a search along the set perpendicular axis;

specifying a midpoint of the detected outer boundary; and setting the position of the pointer in the current frame based on the specified midpoint.

22. An image processing device comprising a controller, wherein the controller is configured to:

acquire an image in which a plurality of indicators is captured;

set a pointer designating a position represented by ends of a first indicator and a second indicator at a position between the end of the first indicator and the end of the second indicator specified based on the acquired image, wherein:

the image in which the plurality of indicators is captured is an image of a hand or finger, the end of the first indicator and the end of the second indicator are a fingertip of a first finger and a fingertip of a second finger;

setting the pointer at a middle position between the fingertip of the first finger and the fingertip of the second finger;

inputting the image of the hand or finger to a learning model generated to output classification information including a first shape indicating a selected state in which the first finger and the second finger are in contact or a second shape indicating a non-selected state in which the first finger and the second finger are separated from each other when the image of the hand or finger is input; and switching a display mode of a pointer located between a tip of the first finger and a tip of the second finger depending on the classification information output by the learning model, wherein the classification indicates a selected state.

23. An image processing device comprising a controller, wherein the controller is configured to:

acquire an image in which a plurality of indicators is captured;

set a pointer designating a position represented by ends of a first indicator and a second indicator at a position between the end of the first indicator and the end of the second indicator specified based on the acquired image, wherein:

the image in which the plurality of indicators is captured is an image of a hand or finger, the end of the first indicator and the end of the second indicator are a fingertip of a first finger and a fingertip of a second finger;

setting the pointer at a middle position between the fingertip of the first finger and the fingertip of the second finger;

detecting a tip of a fingertip by performing a search along a search axis in a predetermined direction on the acquired image of the hand or finger;

setting a perpendicular axis separated from the tip by a predetermined distance and perpendicular to the search axis;

detecting a first outer boundary point and a second outer boundary point of the first finger and the second finger, respectively, by performing a search along the set perpendicular axis;

correcting the direction in a current frame of the search axis based on a first tangent line tangent to a boundary of the first finger at the detected first outer boundary point and a second tangent line tangent to a boundary of the second finger at the detected second outer boundary point; and setting the position of the pointer in the current frame based on the corrected search axis.

24. An image processing device comprising a controller, wherein the controller is configured to:

acquire an image in which a plurality of indicators is captured;

set a pointer designating a position represented by ends of a first indicator and a second indicator at a position between the end of the first indicator and the end of the second indicator specified based on the acquired image, wherein:

the image in which the plurality of indicators is captured is an image of a hand or finger, the end of the first indicator and the end of the second indicator are a fingertip of a first finger and a fingertip of a second finger;

setting the pointer at a middle position between the fingertip of the first finger and the fingertip of the second finger;

storing a position of a fingertip specified when the position of the pointer is set and a direction of a search axis in association with a frame; and setting the position of the pointer by detecting a tip of a fingertip by performing a search along a search axis associated with a current frame based on a position of the fingertip associated with the current frame when the position of the fingertip and a direction of the search axis associated with the current frame are stored.

25. An image processing device comprising
a controller,
wherein the controller is configured to:

acquire an image in which a plurality of indicators is captured;

set a pointer designating a position represented by ends of a first indicator and a second indicator at a position between the end of the first indicator and the end of the second indicator specified based on the acquired image, wherein:

the image in which the plurality of indicators is captured is an image of a hand or finger, the end of the first indicator and the end of the second indicator are a fingertip of a first finger and a fingertip of a second finger;

setting the pointer at a middle position between the fingertip of the first finger and the fingertip of the second finger;

specifying a contour of the hand or finger based on the acquired image of the hand or finger;

associating each point on the specified contour with a distance to a search axis in a predetermined direction;

specifying a point on the contour in a current frame corresponding to a local minimum point of the distance as a fingertip end; and setting the position of the pointer in the current frame based on the local minimum point.

26. An image processing method comprising:

acquiring an image in which a plurality of indicators is captured;

setting a pointer designating a position represented by ends of a first indicator and a second indicator at a position between the end of the first indicator and the end of the second indicator specified based on the acquired image, wherein:

the image in which the plurality of indicators is captured is an image of a hand or finger, the end of the first indicator and the end of the second indicator are a fingertip of a first finger and a fingertip of a second finger;

setting the pointer at a middle position between the fingertip of the first finger and the fingertip of the second finger;

detecting a tip of a fingertip in a current frame by performing a search along a search axis in a predetermined direction on the acquired image of the hand or finger;

setting a perpendicular axis separated from the tip by a predetermined distance and perpendicular to the search axis;

detecting an outer boundary of each of the first finger and the second finger by performing a search along the set perpendicular axis;

specifying a midpoint of the detected outer boundary; and setting the position of the pointer in the current frame based on the specified midpoint.

27. An image processing method comprising:

acquiring an image in which a plurality of indicators is captured;

setting a pointer designating a position represented by ends of a first indicator and a second indicator at a position between the end of the first indicator and the end of the second indicator specified based on the acquired image, wherein:

the image in which the plurality of indicators is captured is an image of a hand or finger, the end of the first indicator and the end of the second indicator are a fingertip of a first finger and a fingertip of a second finger;

setting the pointer at a middle position between the fingertip of the first finger and the fingertip of the second finger;

inputting the image of the hand or finger to a learning model generated to output classification information including a first shape indicating a selected state in which the first finger and the second finger are in contact or a second shape indicating a non-selected state in which the first finger and the second finger are separated from each other when the image of the hand or finger is input; and switching a display mode of a pointer located between a tip of the first finger and a tip of the second finger depending on the classification information output by the learning model, wherein the classification indicates a selected state.

28. An image processing method comprising:

acquiring an image in which a plurality of indicators is captured;

setting a pointer designating a position represented by ends of a first indicator and a second indicator at a position between the end of the first indicator and the end of the second indicator specified based on the acquired image, wherein:

the image in which the plurality of indicators is captured is an image of a hand or finger, the end of the first indicator and the end of the second indicator are a fingertip of a first finger and a fingertip of a second finger;

setting the pointer at a middle position between the fingertip of the first finger and the fingertip of the second finger;

detecting a tip of a fingertip by performing a search along a search axis in a predetermined direction on the acquired image of the hand or finger;

setting a perpendicular axis separated from the tip by a predetermined distance and perpendicular to the search axis;

detecting a first outer boundary point and a second outer boundary point of the first finger and the second finger, respectively, by performing a search along the set perpendicular axis; and correcting the direction in a current frame of the search axis based on a first tangent line tangent to a boundary of the first finger at the detected first outer boundary point and a second tangent line tangent to a boundary of the second finger at the detected second outer boundary point; and setting the position of the pointer in the current frame based on the corrected search axis.

29. An image processing method comprising:

acquiring an image in which a plurality of indicators is captured;

setting a pointer designating a position represented by ends of a first indicator and a second indicator at a position between the end of the first indicator and the end of the second indicator specified based on the acquired image, wherein:

the image in which the plurality of indicators is captured is an image of a hand or finger, the end of the first indicator and the end of the second indicator are a fingertip of a first finger and a fingertip of a second finger;

setting the pointer at a middle position between the fingertip of the first finger and the fingertip of the second finger;

storing a position of a fingertip specified when the position of the pointer is set and a direction of a search axis in association with a frame; and setting the position of the pointer by detecting a tip of a fingertip by performing a search along a search axis associated with a current frame based on a position of the fingertip associated with the current frame when the position of the fingertip and a direction of the search axis associated with the current frame are stored.

30. An image processing method comprising:

acquiring an image in which a plurality of indicators is captured;

setting a pointer designating a position represented by ends of a first indicator and a second indicator at a position between the end of the first indicator and the end of the second indicator specified based on the acquired image, wherein:

the image in which the plurality of indicators is captured is an image of a hand or finger, the end of the first indicator and the end of the second indicator are a fingertip of a first finger and a fingertip of a second finger;

setting the pointer at a middle position between the fingertip of the first finger and the fingertip of the second finger;

specifying a contour of the hand or finger based on the acquired image of the hand or finger;

associating each point on the specified contour with a distance to a search axis in a predetermined direction;

specifying a point on the contour in a current frame corresponding to a local minimum point of the distance as a fingertip end; and setting the position of the pointer in the current frame based on the local minimum point.

31. An in-vehicle interface device comprising a controller, wherein the controller is configured to:

acquire an image in which a plurality of indicators is captured;

set a pointer designating a position represented by ends of a first indicator and a second indicator at a position between the end of the first indicator and the end of the second indicator specified based on the acquired image;

accept an operation by the pointer displayed on an in-vehicle device operation screen, wherein:

the image in which the plurality of indicators is captured is an image of a hand or finger, the end of the first indicator and the end of the second indicator are a fingertip of a first finger and a fingertip of a second finger;

setting the pointer at a middle position between the fingertip of the first finger and the fingertip of the second finger;

detecting a tip of a fingertip in a current frame by performing a search along a search axis in a predetermined direction on the acquired image of the hand or finger;

setting a perpendicular axis separated from the tip by a predetermined distance and perpendicular to the search axis;

detecting an outer boundary of each of the first finger and the second finger by performing a search along the set perpendicular axis;

specifying a midpoint of the detected outer boundary; and setting the position of the pointer in the current frame based on the specified midpoint.

32. An in-vehicle interface device comprising a controller, wherein the controller is configured to:

acquire an image in which a plurality of indicators is captured;

set a pointer designating a position represented by ends of a first indicator and a second indicator at a position between the end of the first indicator and the end of the second indicator specified based on the acquired image;

accept an operation by the pointer displayed on an in-vehicle device operation screen, wherein:

the image in which the plurality of indicators is captured is an image of a hand or finger, the end of the first indicator and the end of the second indicator are a fingertip of a first finger and a fingertip of a second finger;

setting the pointer at a middle position between the fingertip of the first finger and the fingertip of the second finger;

inputting the image of the hand or finger to a learning model generated to output classification information including a first shape indicating a selected state in which the first finger and the second finger are in contact or a second shape indicating a non-selected state in which the first finger and the second finger are separated from each other when the image of the hand or finger is input; and switching a display mode of a pointer located between a tip of the first finger and a tip of the second finger depending on the classification information output by the learning model, wherein the classification indicates a selected state.

33. An in-vehicle interface device comprising a controller, wherein the controller is configured to:

acquire an image in which a plurality of indicators is captured;

set a pointer designating a position represented by ends of a first indicator and a second indicator at a position between the end of the first indicator and the end of the second indicator specified based on the acquired image;

accept an operation by the pointer displayed on an in-vehicle device operation screen, wherein:

the image in which the plurality of indicators is captured is an image of a hand or finger, the end of the first indicator and the end of the second indicator are a fingertip of a first finger and a fingertip of a second finger;

setting the pointer at a middle position between the fingertip of the first finger and the fingertip of the second finger;

detecting a tip of a fingertip by performing a search along a search axis in a predetermined direction on the acquired image of the hand or finger;

setting a perpendicular axis separated from the tip by a predetermined distance and perpendicular to the search axis;

detecting a first outer boundary point and a second outer boundary point of the first finger and the second finger, respectively, by performing a search along the set perpendicular axis;

correcting the direction in a current frame of the search axis based on a first tangent line tangent to a boundary of the first finger at the detected first outer boundary point and a second tangent line tangent to a boundary of the second finger at the detected second outer boundary point; and setting the position of the pointer in the current frame based on the corrected search axis.

34. An in-vehicle interface device comprising a controller, wherein the controller is configured to:

acquire an image in which a plurality of indicators is captured;

set a pointer designating a position represented by ends of a first indicator and a second indicator at a position between the end of the first indicator and the end of the second indicator specified based on the acquired image;

accept an operation by the pointer displayed on an in-vehicle device operation screen, wherein:

the image in which the plurality of indicators is captured is an image of a hand or finger, the end of the first indicator and the end of the second indicator are a fingertip of a first finger and a fingertip of a second finger;

setting the pointer at a middle position between the fingertip of the first finger and the fingertip of the second finger;

storing a position of a fingertip specified when the position of the pointer is set and a direction of a search axis in association with a frame; and setting the position of the pointer by detecting a tip of a fingertip by performing a search along a search axis associated with a current frame based on a position of the fingertip associated with the current frame when the position of the fingertip and a direction of the search axis associated with the current frame are stored.

35. An in-vehicle interface device comprising a controller, wherein the controller is configured to:

acquire an image in which a plurality of indicators is captured;

set a pointer designating a position represented by ends of a first indicator and a second indicator at a position between the end of the first indicator and the end of the second indicator specified based on the acquired image;

accept an operation by the pointer displayed on an in-vehicle device operation screen, wherein:

the image in which the plurality of indicators is captured is an image of a hand or finger, the end of the first indicator and the end of the second indicator are a fingertip of a first finger and a fingertip of a second finger;

setting the pointer at a middle position between the fingertip of the first finger and the fingertip of the second finger;

specifying a contour of the hand or finger based on the acquired image of the hand or finger;

associating each point on the specified contour with a distance to a search axis in a predetermined direction;

specifying a point on the contour in a current frame corresponding to a local minimum point of the distance as a fingertip end; and setting the position of the pointer in the current frame based on the local minimum point.

\* \* \* \* \*